(12) United States Patent
Masterson et al.

(10) Patent No.: US 8,508,661 B1
(45) Date of Patent: Aug. 13, 2013

(54) ENHANCED DEINTERLACING USING PREDICTORS FROM MOTION ESTIMATION ENGINE

(75) Inventors: Anthony D. Masterson, Saratoga, CA (US); Alexander N. Kipnis, Mountain View, CA (US); Dzung Tien Hoang, Austin, TX (US)

(73) Assignee: Zenverge, Inc., Santa Clara, CA (US)

( * ) Notice: Subject to any disclaimer, the term of this patent is extended or adjusted under 35 U.S.C. 154(b) by 844 days.

(21) Appl. No.: 12/362,415

(22) Filed: Jan. 29, 2009

Related U.S. Application Data

(60) Provisional application No. 61/025,628, filed on Feb. 1, 2008.

(51) Int. Cl.
| H04N 7/01 | (2006.01) |
| H04N 11/20 | (2006.01) |
| H04N 5/14 | (2006.01) |
| H04N 9/64 | (2006.01) |
| H04N 7/12 | (2006.01) |
| G06K 9/32 | (2006.01) |
| G09G 5/00 | (2006.01) |

(52) U.S. Cl.
USPC ...... 348/452; 348/448; 348/699; 375/240.16; 375/240.15; 375/240.01; 382/300; 345/606

(58) Field of Classification Search
None
See application file for complete search history.

(56) References Cited

U.S. PATENT DOCUMENTS

| 5,305,104 | A | 4/1994 | Jensen et al. |
| 5,689,305 | A | 11/1997 | Ng et al. |
| 6,331,874 | B1 | 12/2001 | de Garrido et al. |
| 6,408,024 | B1 * | 6/2002 | Nagao et al. ............ 375/240.01 |
| 6,512,550 | B1 | 1/2003 | de Garrido et al. |
| 6,847,405 | B2 | 1/2005 | Hsu et al. |
| 6,992,725 | B2 | 1/2006 | Mohsenian |
| 7,321,396 | B2 | 1/2008 | Jung et al. |
| 7,324,160 | B2 | 1/2008 | Yang |
| 7,538,824 | B1 | 5/2009 | Pillay et al. |
| 7,907,210 | B2 | 3/2011 | Lu et al. |
| 8,144,778 | B2 | 3/2012 | Jia et al. |
| 2007/0206117 | A1 | 9/2007 | Tian et al. |
| 2008/0055477 | A1 | 3/2008 | Wu et al. |
| 2008/0205793 | A1 * | 8/2008 | Nilsson et al. ................ 382/300 |
| 2009/0002553 | A1 * | 1/2009 | Living ........................ 348/452 |
| 2009/0189912 | A1 * | 7/2009 | Holtman ...................... 345/606 |
| 2009/0278981 | A1 * | 11/2009 | Bruna et al. ................. 348/448 |
| 2010/0014586 | A1 * | 1/2010 | Scarpino et al. ......... 375/240.15 |
| 2011/0058106 | A1 * | 3/2011 | Bruna Estrach et al. ..... 348/699 |

OTHER PUBLICATIONS

Markandey, V. et al., "Motion Adaptive Deinterlacer for DMD (Digital Micromirror Device) Based Digital Television," IEEE Transactions on Consumer Electronics, Aug. 1994, pp. 735-742.
United States Office Action, U.S. Appl. No. 12/362,394, Apr. 20, 2012, 10 pages.
United States Office Action, U.S. Appl. No. 12/362,436, May 7, 2012, 9 pages.

* cited by examiner

Primary Examiner — Jefferey Harold
Assistant Examiner — Sean Haiem
(74) Attorney, Agent, or Firm — Fenwick & West LLP

(57) ABSTRACT

An apparatus and method for generating predictors performs motion estimation of a target macroblock in a target field against data segments in reference fields. The same motion estimation engine is used to perform various image processing operations to efficiently use resources of the apparatus. Different reference fields are used depending on modes of operation. In a deinterlacing mode, deinterlacing is performed using directional interpolation, recursive motion compensated deinterlacing, and motion adaptive deinterlacing.

16 Claims, 22 Drawing Sheets

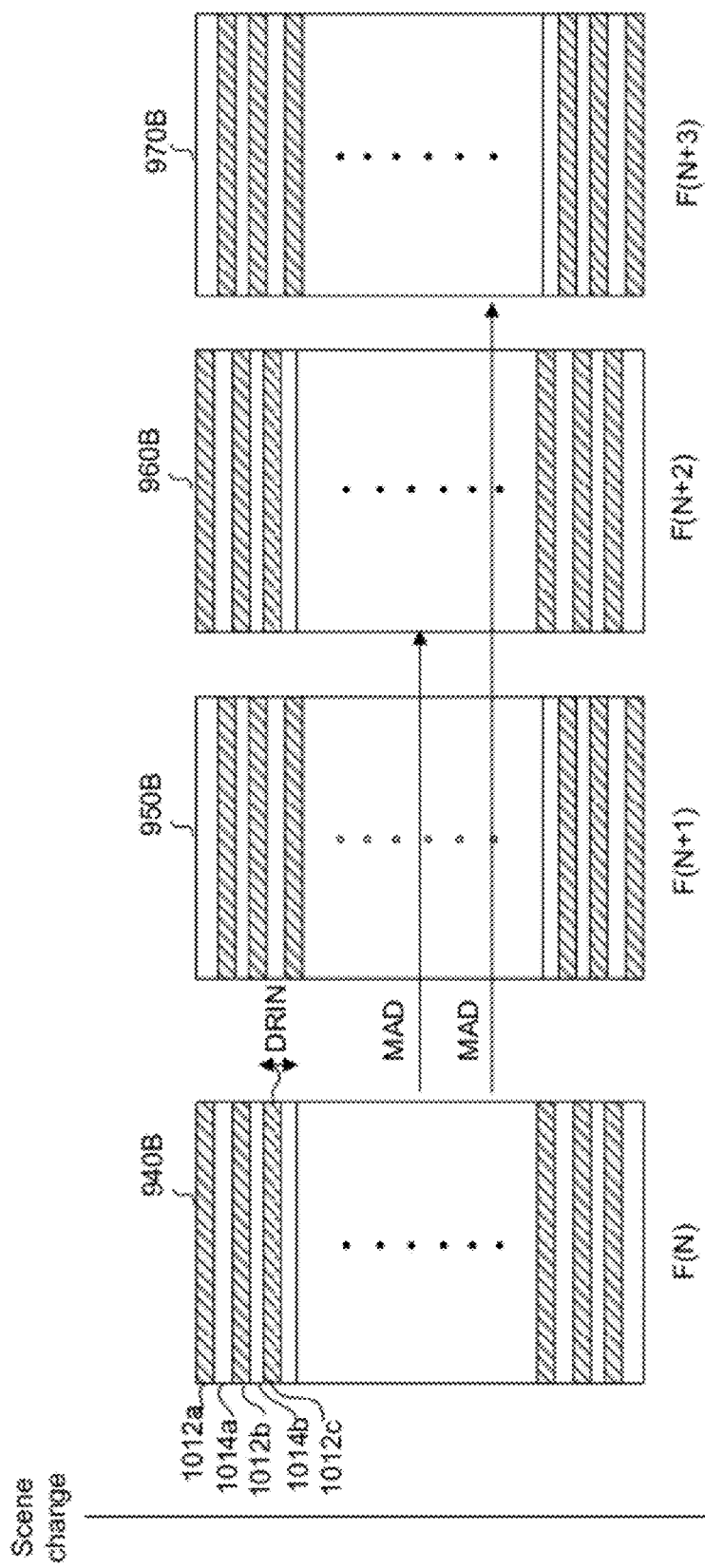

Field Noise Reduction Mode

ENHANCED DEINTERLACING USING PREDICTORS FROM MOTION ESTIMATION ENGINE

CROSS-REFERENCE TO RELATED APPLICATION

This application claims priority under 35 U.S.C. §119(e) to U.S. Provisional Patent Application No. 61/025,628 entitled "Enhanced Deinterlacing Using Predictors from Motion Estimation Engine," filed on Feb. 1, 2008, which is incorporated by reference herein in its entirety.

BACKGROUND

1. Field of Art

The disclosure relates generally to performing motion compensated deinterlacing, and more specifically to deinterlacing using a combination of directional interpolation, motion compensated deinterlacing, and motion adaptive deinterlacing.

2. Description of Related Art

Motion compensation describes a target image in terms of which section (specifically, macroblock) of a target frame came from which section of a reference frame. The motion compensation is often employed in video compression as well as video processing such as deinterlacing, noise reduction, and video stabilization. In order to perform the motion compensation, motion estimation must be performed before performing the motion compensation.

The motion estimation is the process of finding optimal or near-optimal motion vectors of macroblocks in the frames of a video sequence. When using the motion estimation, an assumption is made that objects in the scene have only translational motions. Under such an assumption, a macroblock of the frame is compared with macroblocks in the reference frame to choose the best matching macroblock in the reference frame. Generally, the search for the macroblock is conducted over a predetermined search area (i.e., search window) of the reference frame.

The motion estimation is the most computationally demanding process in image compression applications, and can require as much as 80% of the processor cycles spent in the video encoder. The simplest and most thorough way to perform motion estimation is to evaluate every possible macroblock (e.g., 16×16 pixels) in the search window of the reference frame, and select the best match. Typically, a sum of absolute differences (SAD) or sum of squared differences (SSD) computation is used to determine how closely the pixel region of the reference frame matches a macroblock of the target frame. The SAD or SSD is often computed for the luminance plane only, but can also include the chrominance planes. A relatively small search area of 48 pixels by 24 pixels, for example, contains 1024 possible 16×16 pixel regions at half-pixel resolution. Performing an SAD on the luminance plane only for one such region requires 256 subtractions, 256 absolute value operations, and 255 additions. Thus, not including the interpolation required for non-integer motion vectors, the SAD computations needed to exhaustively scan this search window for the best match require a total of 785,408 arithmetic operations per macro block, which equates to over 4.6 billion arithmetic operations per second at CIF (352 by 288 pixels) video resolution and a modest frame rate of 15 frames per second.

Accordingly, the motion estimation is a crucial operation in video compression and processing. Software or hardware dedicated to perform the motion estimation has been developed and is called a motion estimation engine. The motion estimation engine is very crucial to the performance of video compression and video processing. To enhance accuracy and speed, complex algorithms and dedicated circuits have been employed in the motion estimation engines.

SUMMARY

Embodiments disclose a motion estimation engine operable in various modes, each mode involving motion compensation. Depending on the mode of operation, the motion estimation engine retrieves reference frames in different temporal or spatial relationship with a target frame to generate motion vectors or predictors based on the mode of operation.

In one example embodiment, an image processor is coupled to the motion estimation engine to perform deinterlacing, field noise reduction, or frame noise reduction. The image processor receives the predictors from the motion estimation engine and generates intermediate macroblocks based on the predictors. The intermediate macroblocks are blended to deinterlace the target frame or reduce noise in the target frame.

In one example embodiment, directional interpolation, recursive motion compensated deinterlacing, and motion adaptive deinterlacing are used in combination to deinterlace the target frame. For each pixel for missing lines in the target frame, it is determined whether to use a pixel generated using recursive motion compensated deinterlacing or a pixel generated using the motion adaptive deinterlacing. Then the chosen pixel is blended with a pixel generated by directional interpolation.

In one example embodiment, scene changes and/or telecine of the target frame is detected to adjust the deinterlacing scheme accordingly. The scene change and/or the telecine of the target frame may be detected from a difference macroblock generated by subtracting the luminance (and/or chrominance) values of pixels in the target macroblock and the predictors.

In one example embodiment, the recursive motion compensated deinterlacing of the target frame is performed using an interlaced field of a first previous frame (preceding the target frame) and a noise reduced field of the first previous frame when a scene change is not detected in the target frame or the first previous frame. The noise reduction can be performed simultaneously on the target frame by using the noise reduced field of the first previous frame. The motion adaptive deinterlacing of the target frame is performed using a second previous frame (preceding the first previous frame), the first previous frame, and a first subsequent frame (subsequent to the target frame).

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The disclosed embodiments have other advantages and features which will be more readily apparent from the detailed description, appended claims, and accompanying drawings. The drawings or figures (FIGS.) include:

FIG. 9B is a diagram illustrating reference frames for deinterlacing a target frame when a scene change is detected in the target frame, according to an embodiment.

DETAILED DESCRIPTION

Figure 1:
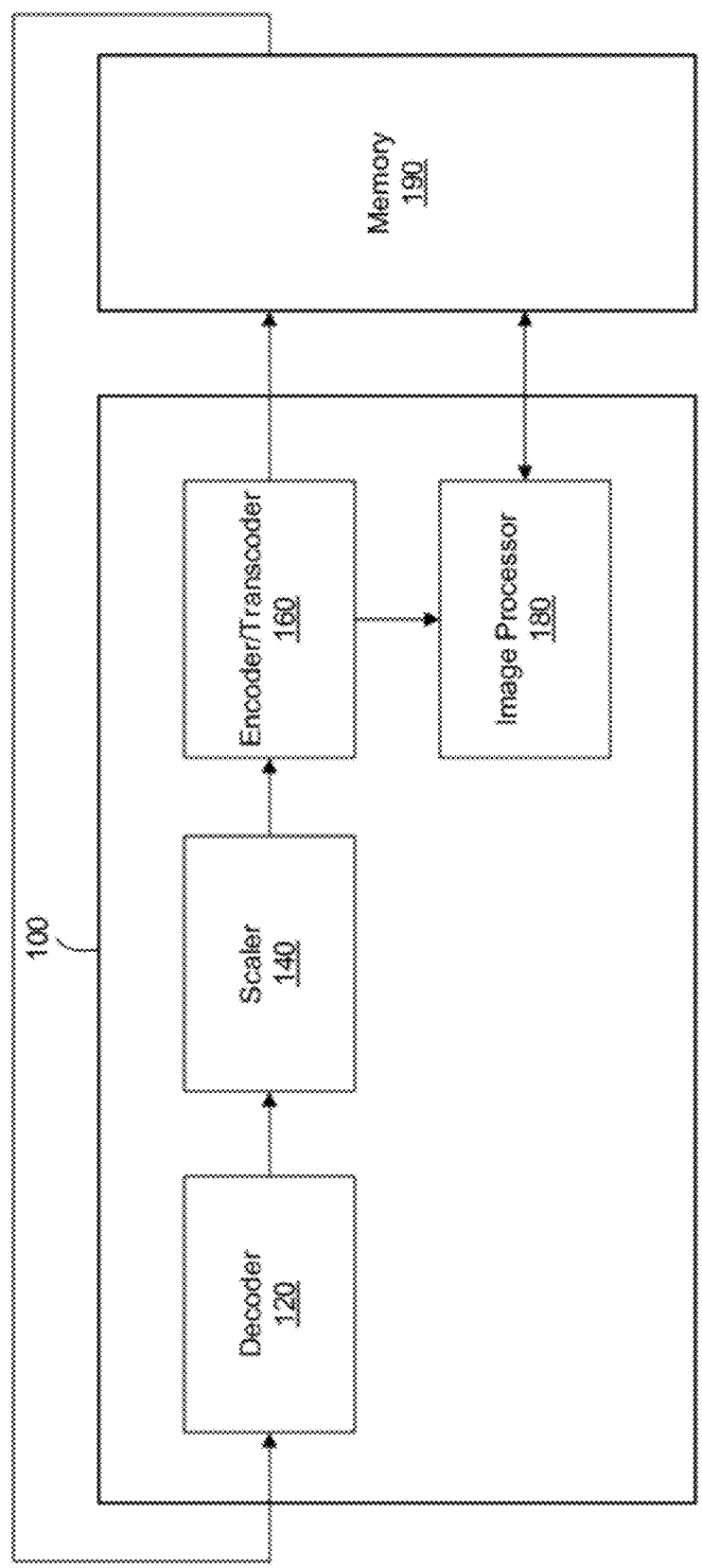
FIG. 1 is a block diagram illustrating an embodiment of a media processor.

The embodiments described herein will be with reference to the accompanying drawings. Like reference numerals are used for like elements in the accompanying drawings.

In embodiments described herein, a media processor performs motion estimation based operations including encoding, deinterlacing, and noise reduction using a motion estimation engine. The same motion estimation engine is used in the media processor to perform multiple types of operations associated with motion estimation, and thereby more efficiently use the resources of the media processor. The motion estimation engine provides predictors for performing motion compensated deinterlacing, and motion compensated noise reduction. The deinterlacing may be performed by generating pixels for the deinterlaced field of a new target frame, and the noise reduction is performed on the pixels of interlaced fields of the target frame. The noise reduction may be performed by blending pixels of the interlaced field of a target frame with pixels of the predictors generated by the motion estimation engine.

A frame describe herein refers to an image in a moving picture. The frame can be an interlaced frame that includes interlaced fields of odd or even horizontal lines separated in time. Alternatively, the frame can be a deinterlaced or progressive frame in which the image has both odd and even horizontal lines at the same point in time. An interlaced frame includes two fields (hereinafter referred to as two "interlaced field", each of which is an image having only odd or even lines.

Deinterlacing comprises the process of generating a field (hereinafter referred to as a "deinterlaced field") with horizontal lines not present in the target interlaced field of an interlaced frame. The deinterlacing can be performed using various methods including, among other methods, directional interpolation, recursive motion compensation, and a motion adaptive method. The interlaced field and the deinterlaced field are combined to form a deinterlaced or progressive frame.

A target frame comprises a frame that is currently being processed by the image processor. A new field for the target frame may be generated (e.g., deinterlacing) or processed (e.g., noise reduction) to modify data already present in the target frame. A reference frame is a relative concept to the target frame. The reference frame is a frame (either deinterlaced or interlaced) used for processing the target frame. The reference frame can be a frame preceding the target frame or it can be a frame subsequent to the target frame.

A field and a frame are hereinafter collectively referenced as an image. For a deinterlaced frame, the image includes the interlaced field and the generated deinterlaced field. The target image is the image that is currently being processed by the image processor. The reference image is a relative concept to the target image and is used for processing the target image.

A data segment refers to data for a portion of the target or reference frame. A data segment includes data for pixels within a certain region of an image. Data segment includes, for example, a macroblock and a window of pixels among others. The macroblock or the window of pixels can include a fixed number of pixels (e.g., 16×16 pixels) or can have a variable number of pixels.

Overview of the Architecture

Figure (FIG.) 1 is a block diagram illustrating an embodiment of a media processor 100. The media processor 100 is coupled to memory 190 to receive unprocessed images and send processed images for storing on the memory 190. The media processor 100 includes, among other components, a decoder 120, a scaler 140, an encoder/transcoder 160, and an image processor 180. The media processor 100 performs various operations including, among other operations, encoding, transcoding, deinterlacing, and noise reduction. The transcoding is performed by the decoder 120, the scaler 140, and the encoder/transcoder 160. The deinterlacing and the noise reduction are performed by modules including, among other modules, the encoder/transcoder 160, and the image processor 180.

Although the media processor 100 is shown in FIG. 1 as being coupled to the memory 190, it is possible to couple the media processor 100 directly to media devices such as a camcorder or a digital video recorder (DVR) to receive a video sequence. In another embodiment, the output from the media processor 100 is coupled directly to a screen device (e.g., a screen or a monitor) to provide the video sequence directly to the display device. When directly coupling the media processor 190 with the media devices, it may be necessary to include a cache memory device in the media processor 100 to store reference frames needed for processing the target frames.

The decoder 120 decodes video sequence data stored on the memory 190 to generate decoded images of the video sequence. The scaler 140 is coupled to the decoder 120 for changing the resolution of the decoded images (e.g., High Definition (HD) resolution to Standard Definition (SD) resolution). The decoder 120, the scaler 140, the encoder/transcoder 160, and the image processor 160, whether alone or in combination with other modules, can be implemented, for example, in software, hardware, firmware or any other combination thereof.

The memory 190 stores, among other data, images for processing and images processed by the media processor 100. In one embodiment, the memory 190 is implemented by, for example, a double-data-rate synchronous dynamic random access memory (DDR2 SDRAM). The memory 190 may be coupled to other modules or devices (not shown) to receive the unprocessed images and transmit the processed images.

In the following, components of the encoder/transcoder 160 and the image processor 180 will be explained further with reference to FIGS. 2 to 8. For the purpose of explanation, the function and operation of the components of the media processor 100 will be described with reference to the deinterlacing mode, specifically when scene changes are not detected in the target frame Frame(N) or the first previous frame Frame(N−1) preceding the target frame. The function and operation of the components of the media processor 100 when scene changes are detected in the target frame Frame(N) or the first previous frame Frame(N−1) will be described below in detail with reference to FIGS. 9B and 9C. Also, the function and operation of the components of the media processor 100 when the media processor 100 is operating in a noise reduction mode will be explained in detail with reference to FIGS. 16 to 18.

Figure 2:
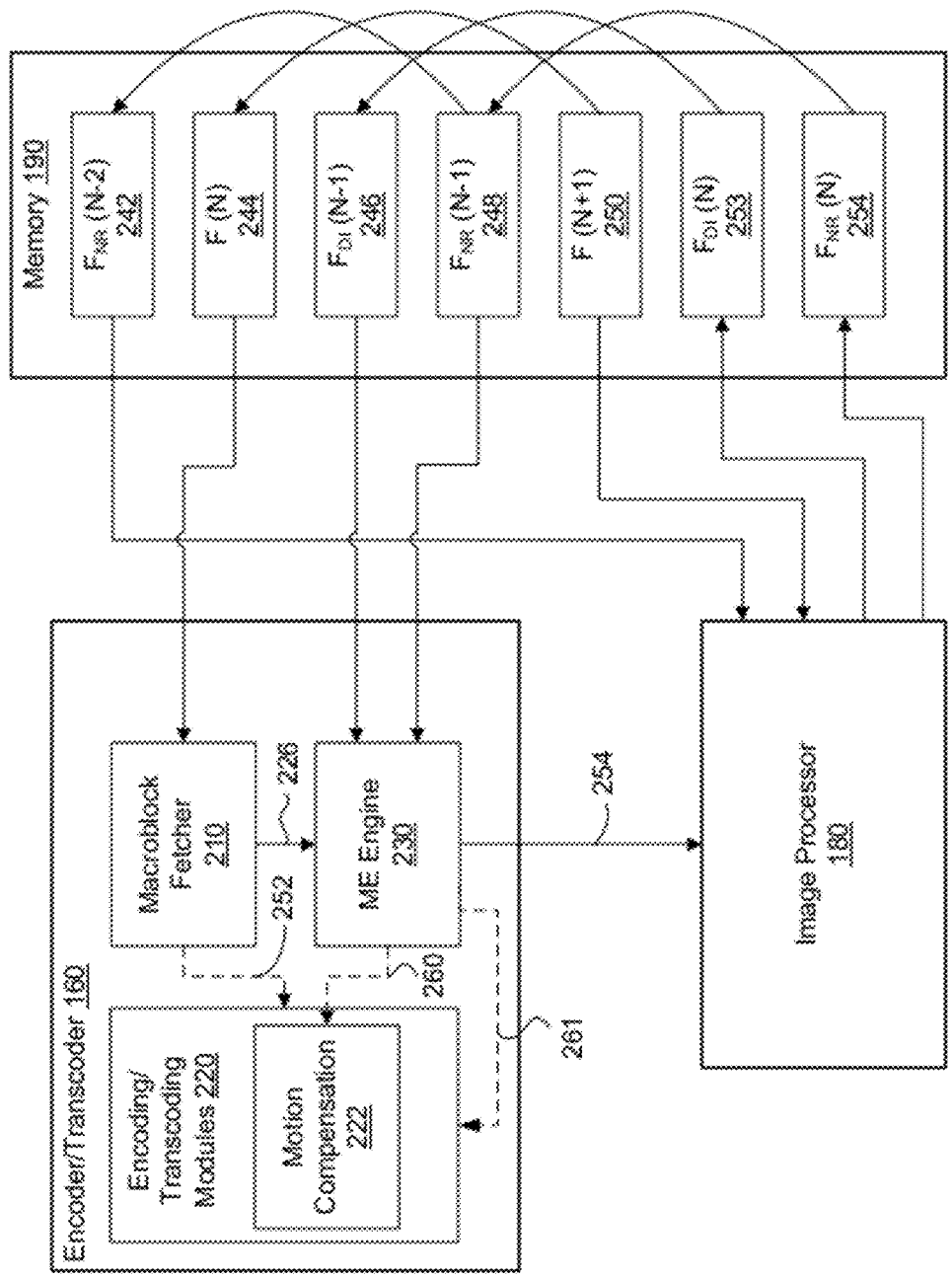
FIG. 2 is a block diagram illustrating in detail an embodiment of an encoder/transcoder, an image processor and memory.

FIG. 2 is a block diagram illustrating in detail an embodiment of a subsystem for performing operations based on the motion estimation that includes, for example, the encoder/transcoder 160, the image processor 180, and the memory 190. The encoder/transcoder 160 includes, among other modules, encoding/transcoding modules 220, a macroblock fetcher 210, and a motion estimation engine 230. The macroblock fetcher 210 is coupled to the memory 190 to retrieve a macroblock (hereinafter referred to as a "target macroblock 252") of the input field F(N). The target macroblock 252 consists of pixels from the luminance and/or chrominance planes.

In an encoding/transcoding mode, the macroblock fetcher 210 feeds the target macroblock 252 for encoding or transcoding to the encoding/transcoding modules 220 (shown as a dashed line). In the encoding/transcoding mode, the motion estimation engine 230 retrieves a first set of reference frames from the memory 190 and performs the motion estimation based on the first set of reference frames. The motion estimation engine 230 provides a motion vector 260 (shown as a dashed line) to a motion compensation module 222 of the encoding/transcoding modules 220 to encode the target frame along with the predictor and residual 261 (shown as a dashed line) to the encoding/transcoding modules 220.

In the deinterlacing mode and the noise reduction mode, the macroblock fetcher 210 retrieves and feeds the target macroblock 252 to the motion estimation engine 230. The motion estimation engine 230 retrieves a second or a third set of reference frames and performs motion estimation based on these reference frames, as explained below in detail with reference to FIG. 10. The motion estimation engine 230 then provides predictors to the image processor 180 via a bus 254.

Continuing reference to FIG. 2, the memory 190 has allocated memory space for data including, among other data, a noise reduced processed second previous field $F_{NR}(N-2)$ 242, a target field F(N) 244, a generated deinterlaced field of a first previous output frame $F_{DI}(N-1)$ 246, a noise reduced processed field of a first previous output frame $F_{NR}(N-1)$ 248, a first subsequent field F(N+1) 250, a generated deinterlaced field of the target output frame $F_{DI}(N)$ 253, a noise reduced processed field of the target output frame $F_{NR}(N)$ 254. The first previous output frame Frame(N−1) includes the noise reduce field $F_{NR}(N-1)$ 248, and the deinterlaced field $F_{DI}(N-1)$ 246. After deinterlacing, the target output frame includes the deinterlaced field $F_{DI}(N)$ 253 and the noise reduced field $F_{NR}(N)$ 254. Before deinterlacing, the target output frame includes only an interlaced field F(N) 244. The second previous output frame includes, the deinterlaced field (not shown) and the noise reduced field $F_{NR}(N-2)$ of the second previous frame. A subsequent frame includes the interlaced field F(N+1). As shown by the arrows between the fields, after a cycle of deinterlacing a target frame, $F_{NR}(N-1)$ 248 becomes $F_{NR}(N-2)$ 242, F(N+1) 250 becomes F(N) 244, $F_{DI}(N)$ 253 becomes $F_{DI}(N-1)$ 246, and $F_{NR}(N)$ 254 becomes $F_{NR}(N-1)$ 248. The number of frames doubles from input to output for deinterlacing as the deinterlacing function effectively converts fields into frames.

In one embodiment, different reference pictures are retrieved from the memory 190 depending on the operation being performed by the media processor 100. In the encoding/transcoding mode, one reference picture from the memory 190 can be retrieved and fed to the motion estimation engine 230 to generate a motion vector for a P-picture. Two reference pictures can be retrieved from the memory 190 and provided to the motion estimation engine 230 to generate a motion vector for a B-picture.

In one embodiment, the image processing mode includes, among other modes, a deinterlacing mode, a field noise reduction mode, and a frame noise reduction mode. In the deinterlacing mode, the motion estimation engine 230 retrieves a previous deinterlaced frame and various interlaced fields to deinterlace the target field F(N). The used reference fields differ depending on whether scene changes are detected in the target field or the first previous field (preceding the target field), as explained in detail with reference to FIGS. 9A to 9C. In the field noise reduction mode, a $MP_{FD}$ predictor is generated by the motion estimation engine 230 using an interlaced field of a first previous field and an interlaced second previous field, as described below in detail with reference to FIG. 16. In the frame noise reduction mode, a $MP_{FM}$ predictor is generated by the motion estimation engine 230 using a previous deinterlaced frame, as described below in detail with reference to FIG. 18.

Motion Estimation Engine

Figure 3:
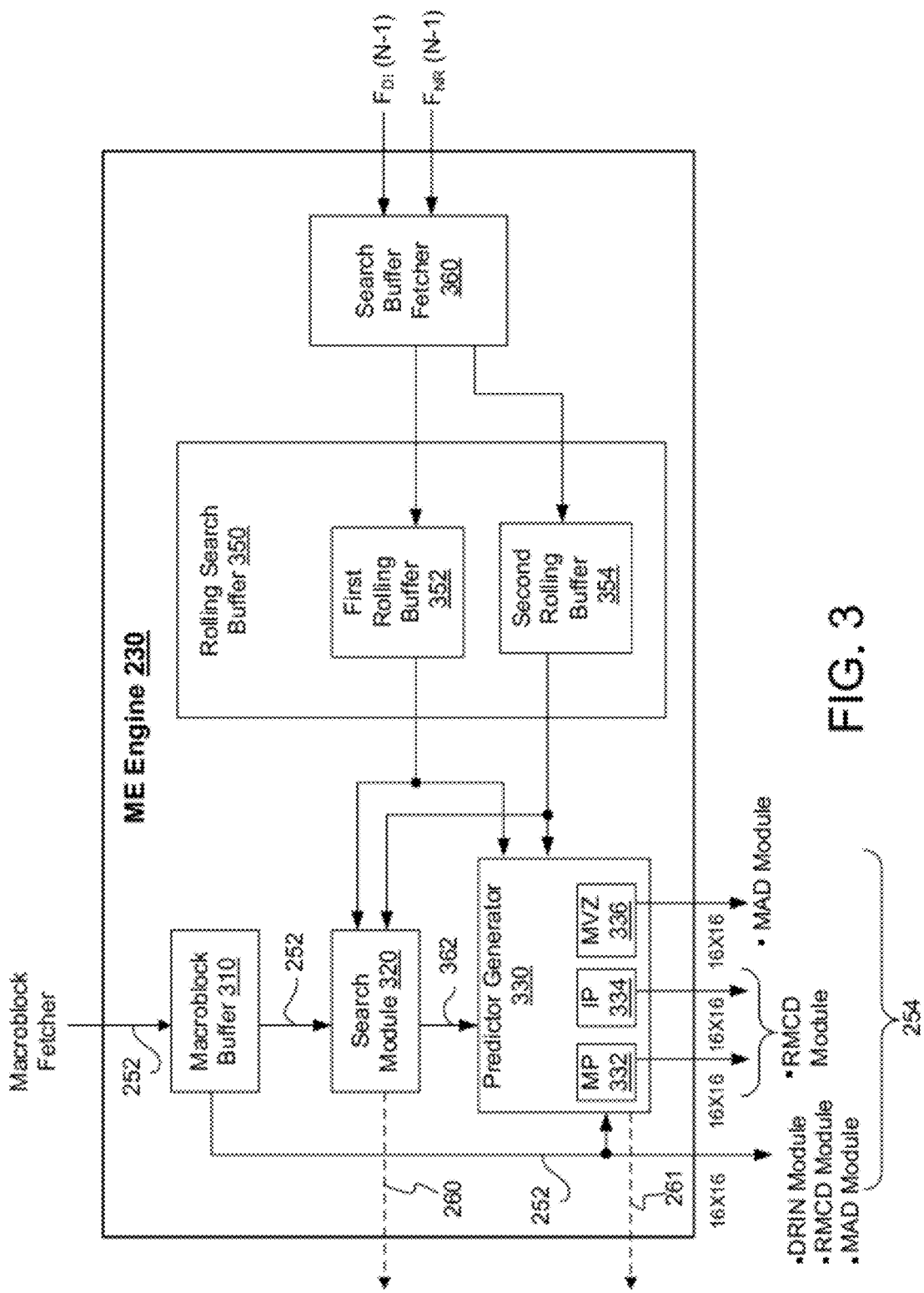
FIG. 3 is a block diagram illustrating an embodiment of a motion estimation engine.

FIG. 3 is a block diagram illustrating an embodiment of a motion estimation engine 230. The motion estimation engine 230 includes, among other components, a macroblock buffer 310, a search module 320, a predictor generator 330, a rolling search buffer 350, and a search buffer fetcher 360. The rolling search buffer 350 includes a first rolling buffer 352 and a second rolling buffer 354. The motion estimation engine 230 performs block matching between the target macroblock 252 and the data segments stored in the rolling search buffer 350. The block matching process identifies a block of pixels of the reference fields as a matching pixel (MP) predictor 332 and an in-between pixel (IP) predictor 334 for describing the current target macroblock 252.

To identify the proper MP and IP predictors, the target macroblock 252 is fetched by the macroblock fetcher 210 and sent to the macroblock buffer 310. The macroblock buffer 310 also sends the target macroblock 252 to modules of the image processor 180 via a bus 254. Data segments from the deinterlaced field $F_{DI}(N-1)$ of the first previous output frame and data segments from the noise reduced field $F_{NR}(N-1)$ of the first previous output frame are retrieved by the search buffer fetcher 360 and stored in the first rolling buffer 352 and the second rolling buffer 354, respectively.

The search module 320 then compares the target macroblock 252 with the data segments in the first and second search buffers 352, 354. The size of data segment stored in the first rolling buffer 352 and the size of the data segment stored in the second rolling buffer 354 are larger than the size of the target macroblock 252. The data segments in the first and second rolling buffers 352, 354 are the regions of the deinterlaced field $F_{DI}(N-1)$ of the first previous output frame and the noise reduced field $F_{NR}(N-1)$ of the first previous output frame on which the block matching of the target macroblock 252 is performed.

The in-between pixel (IP) predictor contains pixels that are vertically in between the pixels from the matching pixel (MP) predictor when the two reference fields $F_{DI}(N-1)$ and $F_{NR}(N-1)$ are combined as a frame. This also applies to sub-pixel positioning of the MP and IP predictors. The IP predictor starts one line above the MP predictor if the target field F(N) is a bottom field, and the IP predictor starts one line below the MP predictor if the target field F(N) is a top field.

In one embodiment, the search module 230 performs a full-pel search by computing sums of absolute differences (SAD) or sums of squared differences (SSD) between the pixels of the target macroblock 252, and the pixels stored in the first and second rolling buffers 352, 354 at various offsets to generate a motion vector for the MP and IP predictor generators 332 and 334. The smaller the SAD or SSD, the better the match between the target macroblock 252 and the block of pixels of the data segments in the rolling search buffer 350. The search module 320 keeps track of the smallest SAD or SSD computed during the full-pel search process to determine the block of pixels at the offset location of the data segments in the rolling search buffer 350 that best matches the target macroblock 252.

After the full-pel search, a sub-pel search is performed to obtain a more accurate non-integer offset value between the target macroblock 252 and the best matching block of pixels in the rolling search buffer 350 to generate a motion vector for the predictor 330. The motion vector is fed to the predictor generator 330 via a bus 362. The encoding/transcoding mode, the search module 320 sends a motion vector 260 indicating vertical and horizontal pixel offset between the target macroblock 252 and the best matching block of pixels in the rolling search buffer 350 to the motion compensation module 222 of the encoding/transcoding modules 220. In the encoding/transcoding mode, the MP predictor 332 and the IP predictor 334 along with the residual 261 are sent to the encoding/transcoding modules 220.

The predictor generator 330 coupled to the search module 320 generates two predictors based on the motion vector, and the data segments stored in the rolling search buffer 350. Specifically, based on the motion vector from the search module 320 and the pixels in the rolling search buffer 350, the predictor generator 330 generates the MP predictor 332 and the IP predictor 334. The predictor generator 330 also generates a motion vector zero (MVZ) macroblock 336 which is a block of pixels from $F_{NR}(N-1)$ 248 representing a motion vector of zero in the opposite field.

In the deinterlacing mode, the target macroblock 252, the MP predictor 332, the IP predictor 334, and the MVZ macroblock 336 are sent to the image processor 180 via the bus 254. Although the sub-pel search was performed in this embodiment, only the full-pel search may be performed.

Image Processor

Figure 4:
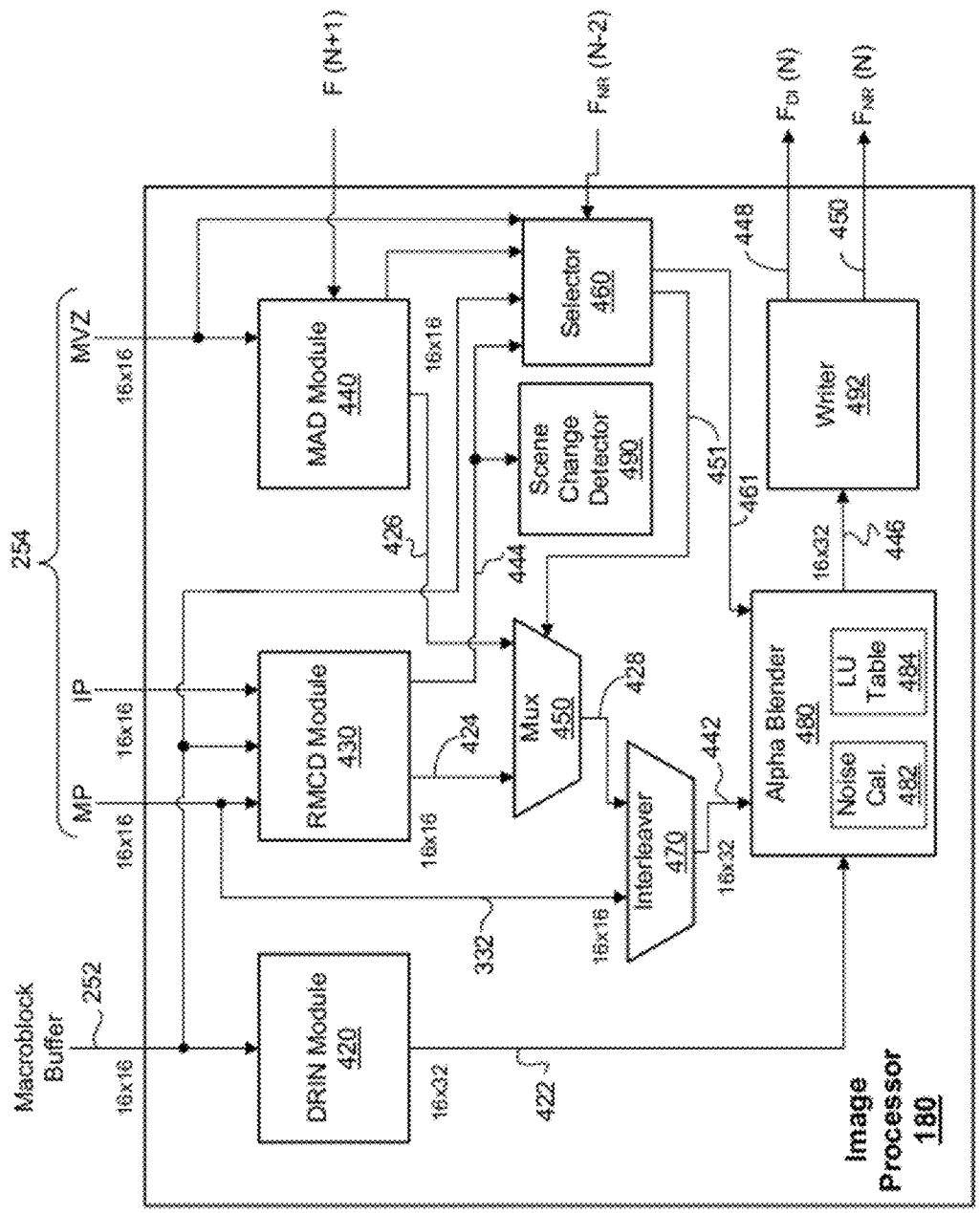
FIG. 4 is a block diagram illustrating an embodiment of an image processor for performing deinterlacing.

FIG. 4 is a block diagram illustrating an embodiment of an image processor 180. The image processor 180 includes, among other modules, a directional interpolation (DRIN) module 420, a recursive motion compensated deinterlacing (RMCD) module 430, a motion adaptive deinterlacing (MAD) module 440, a multiplexer 450, an interleaver 470, a scene change detector 490, a selector 460, an alpha blender 480, and a writer 492. The DRIN module 420 receives the target macroblock 252 via the bus 252 from the motion estimation engine 230 and outputs a directionally interpolated (DI) macroblock 422, as explained in detail below with reference to FIG. 5. The DRIN macroblock 422 includes twice the number of pixels of the target macroblock 252. For example, if the target macroblock 252 has 16×16 pixels, the DRIN macroblock 422 has 16×32 pixels because the DRIN macroblock 422 includes the pixels of the deinterlaced lines.

The RMCD module 430 receives the target macroblock 252, the MP predictor 332, and the IP predictor 336, and outputs a recursive motion compensation deinterlaced (RMCD) macroblock 424 to the multiplexer 450, as explained in detail below with reference to FIG. 6. The RMCD macroblock 424 has only the pixels for the deinterlaced lines; and thus, the RMCD macroblock 424 has the same number of pixels as the target macroblock 252. For example, if the target macroblock 252 has 16×16 pixels, the RMCD macroblock 424 also has 16×16 pixels.

The MAD module 440 receives the MVZ macroblock 336 and outputs a motion adaptive deinterlaced (MAD) macroblock 426 to the multiplexer 450. The MAD macroblock 426, like the RMCD macroblock 424, includes only the pixels for the deinterlaced lines; and thus, the MAD macroblock 426 has the same number of pixels as the target macroblock 252. For example, if the target macroblock 252 has 16×16 pixels, the RMCD macroblock 424 also has 16×16 pixels. The number of pixels for various types of macroblocks is shown in FIG. 4 for purpose of explanation, and a different number of pixels may be used for each macroblock.

In the deinterlacing mode, the selector 460 determines, for each pixel in the lines of the deinterlaced field, whether to use a pixel from the RMCD macroblock 424 or to use a pixel at the corresponding location of the MAD macroblock 426, as explained below in detail with reference to FIG. 8. The selector 460 sends a multiplexer control signal 451 instructing whether the multiplexer 450 should choose the pixel from the RMCD macroblock 424 or the corresponding pixel from the MAD macroblock 426 to generate a multiplexer macroblock 428. The multiplexer macroblock 428 includes the same number of pixels as the target macroblock 252. For example, if the target macroblock 252 has 16×16 pixels, the multiplexer macroblock 428 also has 16×16 pixels. Each module of the image processor 180, whether alone or in combination with other components, can be implemented for example, in software, hardware, firmware or any other combination thereof.

In the deinterlacing mode, the multiplexer macroblock 428 assembled from the RMCD macroblock 424 and the MAD macroblock 426 as selected by the selector 460 is fed to the interleaver 470. The interleaver 470 then interleaves the multiplexer macroblock 428 with the MP predictor 332 to generate an interleaved macroblock 442. Specifically, the interleaver 470 weaves lines of the multiplexer macroblock 428 into odd lines (or even lines), and lines of the MP predictor 332 into even lines (or odd lines) of the interleaved macroblock 442. The interleaved macroblock 442 includes twice the number of pixels compared to the target macroblock 252 because the interleaved macroblock 442 includes the deinterlaced lines. For example, if the target macroblock 252 has 16×16 pixels, the interleaved macroblock 442 has 16×32 pixels.

The alpha blender 480 includes, among other modules, a noise calculation module 482 and a look-up table 484 for determining an alpha value for blending the DRIN macroblock 422 and the interleaved macroblock 442. In the deinterlacing mode, the noise calculation module 482 of the alpha blender 480 receives a difference macroblock 444 (described below in detail with reference to FIG. 9) from the RMCD module 430 and calculates noise in the target macroblock 252. The noise calculation module finds the minimum SAD for macroblock 444 across the entire target field F(N) because uniform noise causes a constant error to the motion compensation.

Based on the noise calculated by the noise calculation module 482 and the error macroblock 461 from selector 460, the alpha value for the pixel is decided from the look-up table 484. Specifically, the look-up table 484 stores alpha values corresponding to a certain value of noise in the target macroblock 252 and the amount of error on a per pixel basis from the error macroblock 461. Increased noise in the video means either that the alpha value is selected to give a higher weight to pixels from the RMCD module 430 or that the MAD module 440 needs to allow a bigger per pixel error in the macroblock 461. The alpha value thus determined is used for blending the DRIN macroblock 422 and the interleaved macroblock 442 with weights for each pixel determined by the alpha value. A blended macroblock 446 is generated by the alpha blender 480 as a result and is provided to the writer 492.

The look-up table 484 can be replaced with a processing module generating the alpha value in accordance with a predetermined algorithm based on the noise calculation from the difference macroblock 444 and the error macroblock 461. Each module of the alpha blender 480, whether alone or in combination with other components, can be implemented for example, in software, hardware, firmware or any other combination thereof.

In the deinterlacing mode, the writer 492 then divides up the blended macroblock 446 into a deinterlaced macroblock 448 and a noise reduced macroblock 450. The deinterlaced macroblock 448 includes the horizontal lines that were missing from the target field F(N); and thus, the deinterlaced macroblock 448 forms part of the deinterlaced field $F_{DI}(N)$ of the target output frame Frame(N). The noise reduced macroblock 450 includes the horizontal lines already present in the target field F(N), but with reduced noise. The noise reduction occurs in the course of blending the DRIN macroblock 422 with the interleaved macroblock 442. Specifically, the noise reduction is a motion compensated noise reduction because the MP predictor 332 is blended with the target macroblock 252. The noise reduced macroblock 450 is stored in the memory 190 as part of the noise reduced field $F_{NR}(N)$ of the target output frame Frame(N).

The scene change detector 490 receives the difference macroblock 444, which is the pixel differences between the MP predictor 332 and the target macroblock 252, from the RMCD module 430. The scene change detector 490 calculates the motion compensated sum of absolute differences (SAD) between the entire target field F(N) and the previous field F(N−1). When the total SAD value for the entire field exceeds a predetermined value, the scene change 490 determines that a scene change has occurred and a scene change flag indicative of the scene change is stored in the scene change detector. The scene change flag may be read by a device controller (not shown) coupled to the media processor 100 to instruct the motion estimation engine 230 and the image processor 180 to perform deinterlacing as explained in detail below with reference to FIGS. 9A to 9C.

Figure 5:
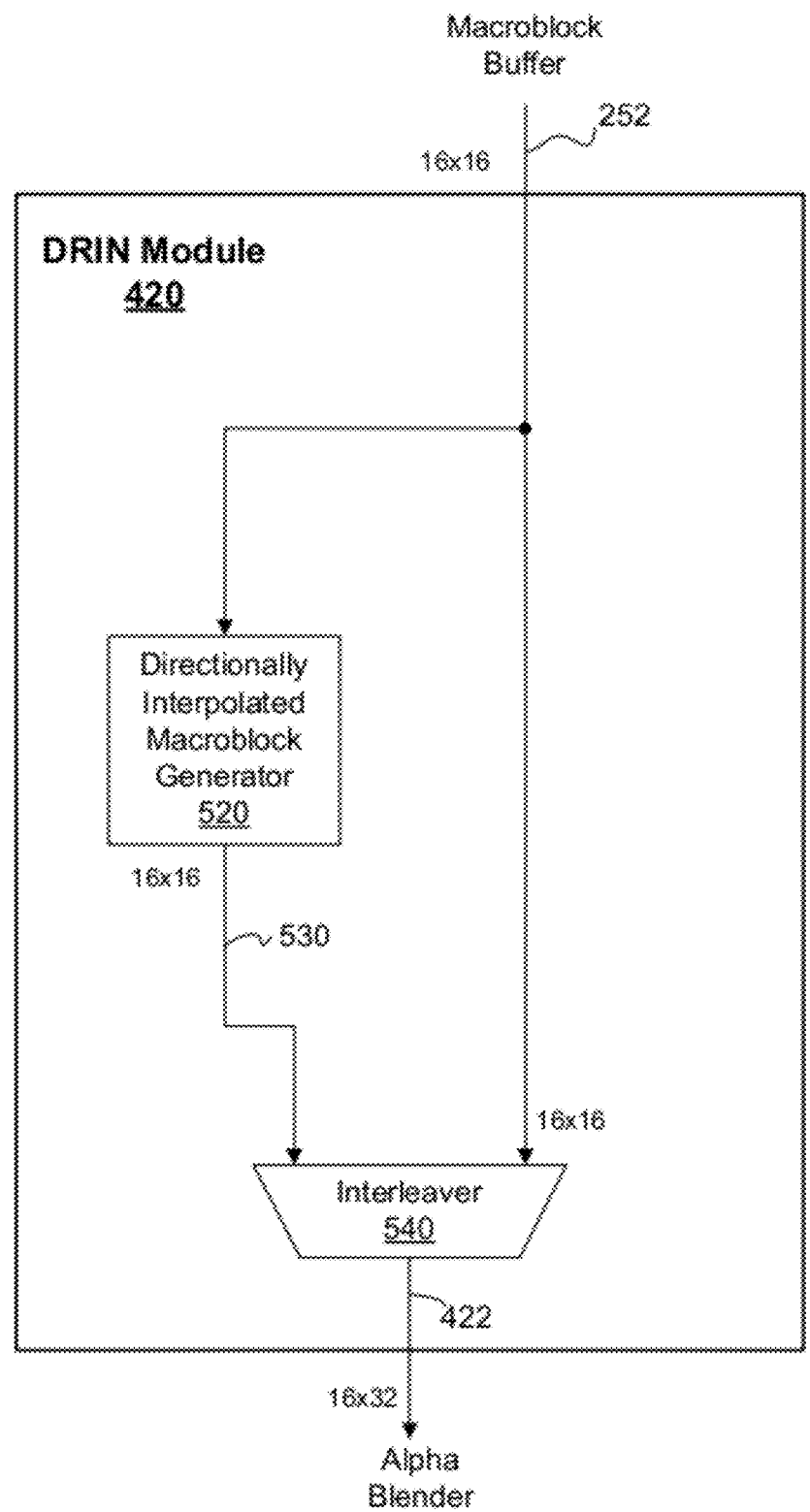
FIG. 5 is a block diagram illustrating an embodiment of a directional interpolation module.

FIG. 5 is a block diagram illustrating an embodiment of a DRIN module 420. The DRIN module 420 includes a directionally interpolated macroblock generator 520 and a DRIN interleaver 540. The directionally interpolated macroblock generates an intermediate macroblock 530, for example, as described in Vishal Markandey et al. "Motion Adaptive Deinterlacer for DMD (Digital Micromirror Device) Based Digital Television," in IEEE Transactions on Consumer Electronics, pp. 735-742, August 1994, which is incorporated by reference herein in its entirety. The method described in the reference is similar to what is used in this embodiment except that the filter is 5 pixels wide instead of 3 pixels.

In the directionally interpolated macroblock generator 520, the differences of pixel pairs of the target macroblock 252 are calculated and the pair with the smallest difference is selected. The pair is then interpolated to generate a pixel of an intermediate directionally interpolated (DI) macroblock 530. The DRIN interleaver 540 weaves lines of the intermediate DRIN macroblock 530 into odd lines (or even lines), and lines of the target macroblock 252 into even lines (or odd lines) of the DRIN macroblock 530 to obtain the DRIN macroblock 422. The DRIN macroblock 422 is then fed into the alpha blender 480. Each module of the DRIN module 420, whether alone or in combination with other components, can be implemented for example, in software, hardware, firmware or any other combination thereof.

Figure 6:
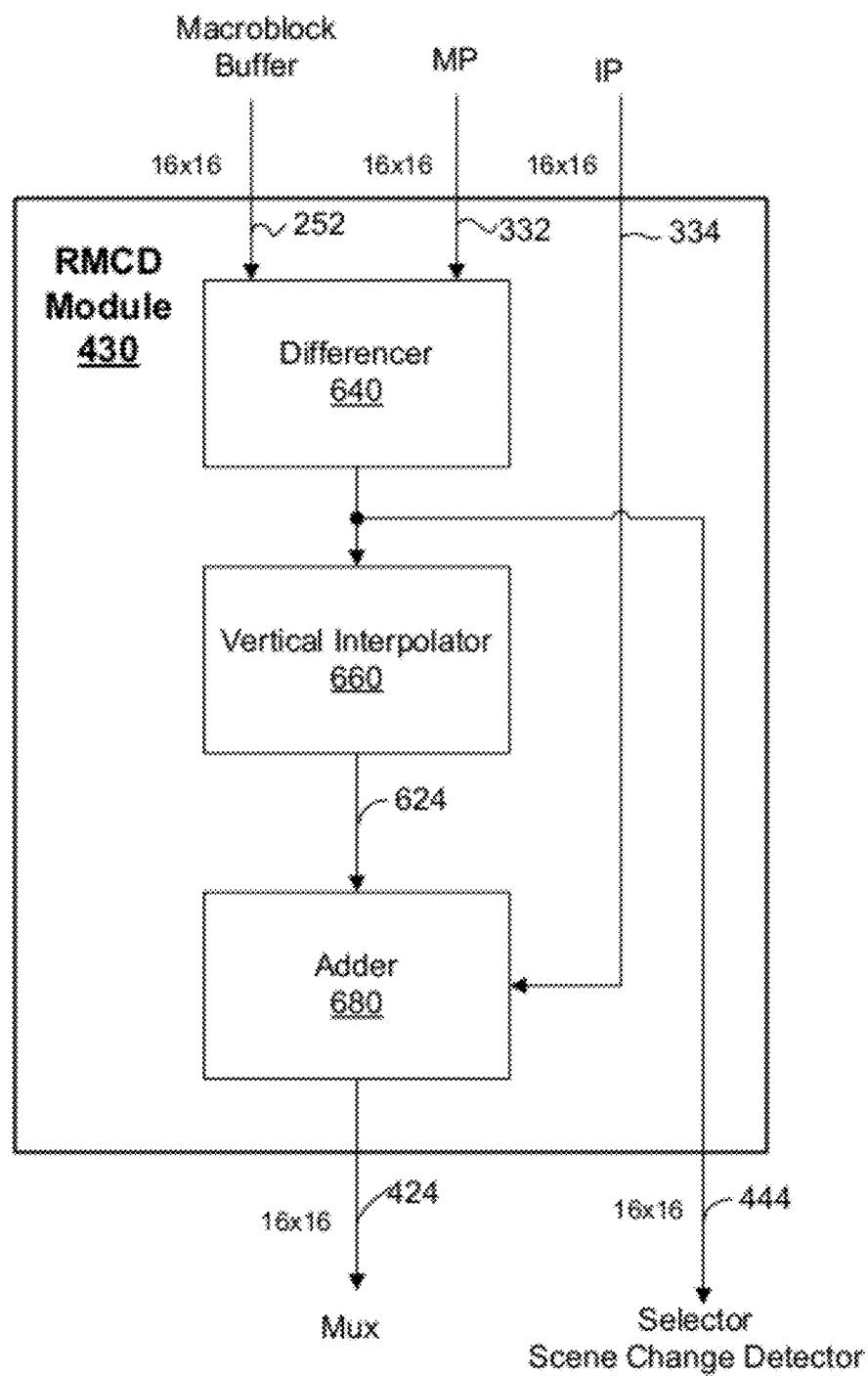
FIG. 6 is a block diagram illustrating an embodiment of a recursive motion compensated deinterlacing module.

FIG. 6 is a block diagram illustrating an embodiment of the RMCD module 430. The RMCD module 430 includes, among other modules, a differencer 640, a vertical interpolator 660, and an adder 680. The differencer 640 generates the difference macroblock 444 in the luminance and chrominance planes by subtracting the luminance and chrominance values of pixels of the MP predictor 332 from the luminance and chrominance values of the corresponding pixels of the target macroblock 252. The vertical interpolator 660 then interpolates the difference pixels in the difference macroblock 444 between a first line with pixels with a second line below (or above) the first line. The generated interpolated pixels form an interpolated difference macroblock 624. The adder then adds the IP predictor 334 to the interpolated difference macroblock 624 to generate the RMCD macroblock 424. The RMCD macroblock 424 is then sent to the multiplexer 450. The RMCD macroblock 424 has the same number of pixels as the target macroblock 252. For example, if the target macroblock 252 has 16×16 pixels, the RMCD macroblock 424 also has 16×16 pixels. Each module of the RMCD module 430, whether alone or in combination with other components, can be implemented for example, in software, hardware, firmware or any other combination thereof.

Figure 7:
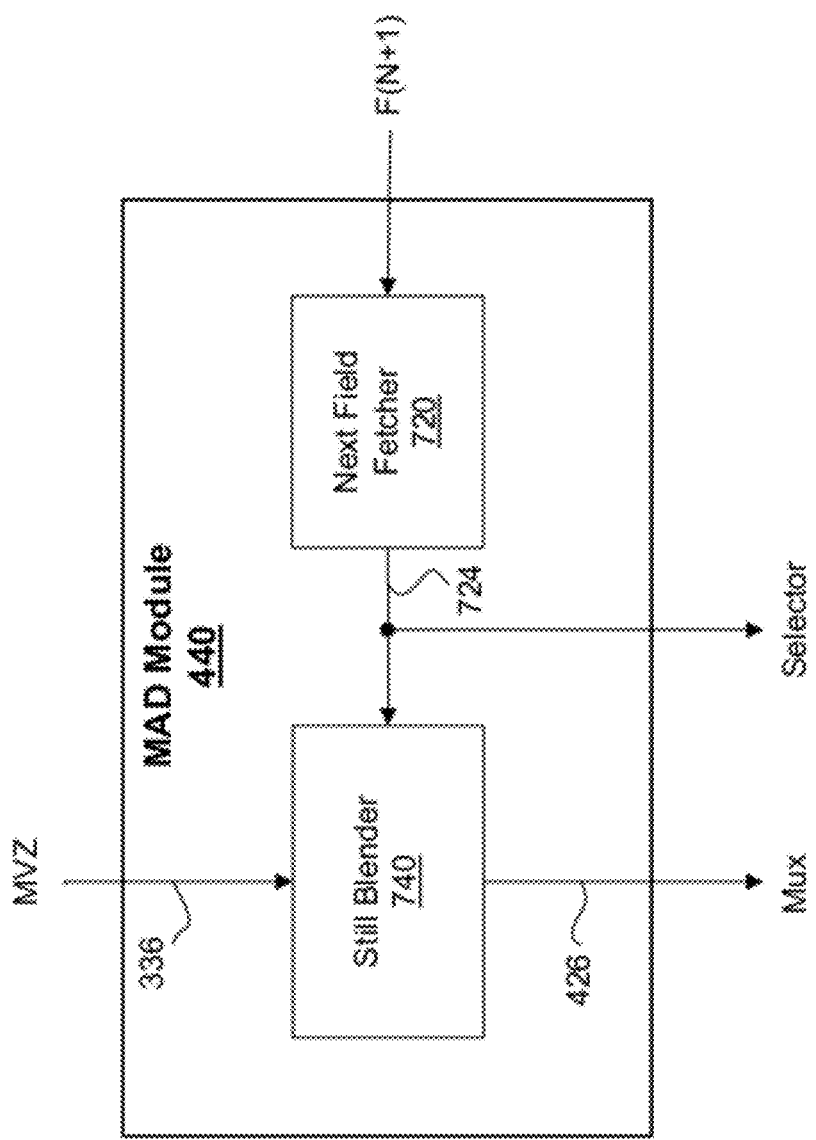
FIG. 7 is a block diagram illustrating an embodiment of a motion adaptive deinterlacing module.

FIG. 7 is a block diagram illustrating an embodiment of the MAD module 440. The MAD module 440 generates a MAD macroblock 426 by averaging the MVZ macroblock 336 and a macroblock from the next field F(N+1). The averaging operation achieves noise reduction. In the deinterlacing mode, a pixel in the MAD macroblock 426 is more appropriate than the RMCD macroblock 424 when the pixel is part of a still image in the video sequence. The MAD module includes, among other modules, a still blender 740 and a next field fetcher 720. The next field fetcher 720 fetches a next macroblock 724 from a location of the subsequent interlaced field F(N+1) that corresponds to the MVZ macroblock 336. The next macroblock 724 is then averaged with the MVZ macroblock 336 by the still blender 740 to reduce noise. The next macroblock 724 is also sent to the selector 460. Note that the MVZ macroblock 336 and the next macroblock 724 are both from fields opposite to the target macroblock 252. The MAD macroblock 426 has the same number of pixels as the target macroblock 252. For example, if the target macroblock has 16×16 pixels, the MAD macroblock 426 also has 16×16 pixels.

Figure 8:
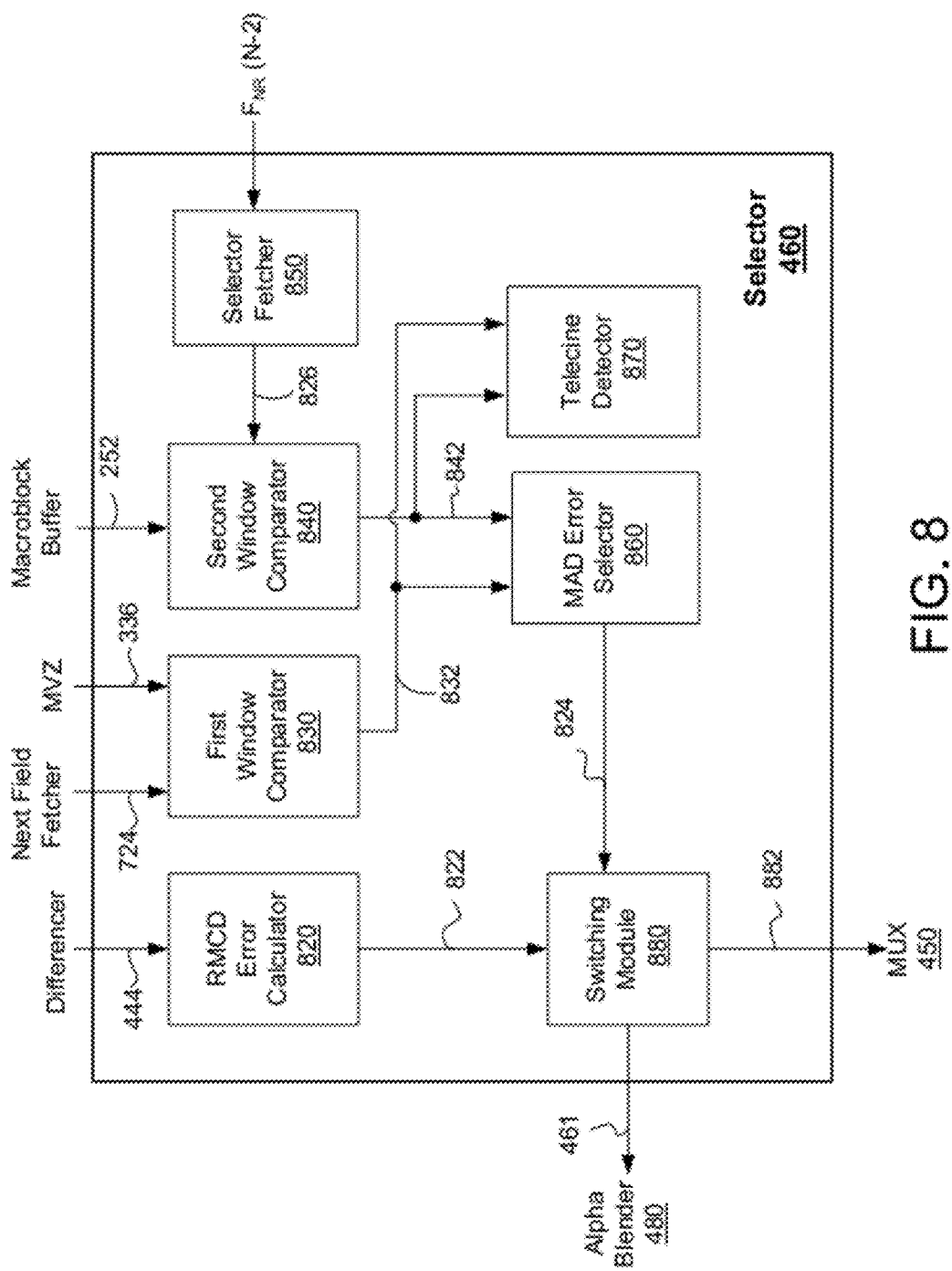
FIG. 8 is a block diagram illustrating an embodiment of a selector.

FIG. 8 is a block diagram illustrating an embodiment of the selector 460. The selector 460 includes, among other modules, a RMCD error calculator 820, a first window comparator 830, a second pixel window comparator 840, a selector fetcher 850, a switching module 880, an MAD error selector 860, and a telecine detector 870. In one embodiment, the RMCD error calculator 820 calculates a RMCD error 822 for each pixel in the RMCD macroblock (hereinafter referred to as a target pixel) based on the difference macroblock 444. The RMCD error 822 represents the deviation of the nearby pixels in the MP predictor 332 from the corresponding pixels in the target macroblock 252. The higher the RMCD error 822 for a given pixel, the less likely that the corresponding pixel in the RMCD macroblock 424 will be appropriate compared to a corresponding pixel in the MAD macroblock 426. As explained below, pixels in the MAD macroblock 426 are more appropriate than the pixels in the RMCD macroblock 424 when the pixels are part of a still image of the video sequence.

The selector fetcher 850 retrieves a second previous macroblock 826 from the noise reduced field $F_{NR}(N-2)$ of the second previous field and provides the second previous macroblock 826 to the second window comparator 840. The location of the second previous macroblock 826 in the second previous field is the same as the location of the target macroblock 252 in the target interlaced field F(N).

In one embodiment, the RMCD error 822 is calculated from a maximum difference 822 of pixels of the target macroblock and corresponding pixels of the MP predictor 332 across a five-pixel window. Specifically, the RMCD error calculator 820 calculates the RMCD error 822 of a target pixel from the maximum difference of the following five pixels: the target pixel, two pixels to the left of the target pixel, and two pixels to the right of the target pixel. If pixels to the left or right are unavailable because the pixels go beyond what is provided by the difference 444, then the closest available pixels are duplicated as a substitute. By using the maximum difference across five pixels, the RMCD error can be more accurately determined even if there is an aberration or noise in the target pixel. The maximum difference of the five-pixel window can be calculated conveniently from the difference macroblock 444. The RMCD error 822 is sent to the switching module 880 for comparison with an MAD error 824, as explained below.

For a target pixel, the first window comparator 830 obtains a first difference 832 which is the maximum difference between pixels in a target window of the MVZ macroblock 336 and the corresponding pixels in a next field window of the next macroblock 724. The target field window includes the target pixel, two pixels to the left of the target pixel, and two pixels to the right of the target pixel. If pixels to the left or right are unavailable because the pixels go beyond what is provided by the difference 832, then the closest available pixels are duplicated as a substitute. The second window comparator 840 calculates a second difference 842 between the target field window and a second previous field window including pixels of the second previous macroblock 826 at locations corresponding to the physical pixel locations directly above and below the pixels in the target field window. The second window comparator 840 compares the locations above and below the target pixel and passes the larger value on as the second difference 842. The MAD error selector 860 chooses the higher value of the first difference 832 and the second difference 842 as the MAD error 824 for that target pixel including two pixels to the left and two pixels to the right. If pixels to the left or right are unavailable because they go beyond what is provided by the difference 832 or 842, then the closest available pixels are duplicated as a substitute. The MAD error 824, for each pixel, represents the maximum difference in a 5 pixel window between the pixels of the MVZ macroblock 336 and the corresponding pixels in the next field F(N+1) and the maximum difference in a 5 pixel window for the pixel rows above and below the target pixel location between the target macroblock 252 and the noise reduced field $F_{NR}(N-2)$.

The switching module 880 compares the RMCD error 822 and the MAD error 824 on a pixel by pixel basis. Then the switching module 880 sends a multiplexer control signal 882 to the multiplexer 450 and the final error signal 461 to the alpha blender 480. If the RMCD error 822 is smaller than the MAD error 824, the pixel in the RMCD macroblock 424 is selected as the pixel for the target pixel of the multiplexer macroblock 428. Conversely, if the RMCD error 822 is greater than or equal to the MAD error 824, the pixel of the MAD macroblock 426 is selected as the pixel for the target pixel of the multiplexer macroblock 428. By selecting every target pixel from the macroblocks 424, 426 in accordance with the RMCD error 822 and the MAD error 824, each pixel of the missing line in the target frame F(N) is adaptively selected. That is, when the target pixel is part of a moving picture, the pixels in the RMCD macroblock 424 is generally selected whereas when the target pixel is part of a still picture, the pixels in the MAD macroblock 426 is generally selected. The 5 pixel window advantageously reduces artifacts due to a single pixel impulse condition. The final error for the pixel selected is passed to the alpha blender so that a final decision can be made on the amount of blending between the best RMCD or MAD temporally calculated pixel and the DRIN or directionally interpolated spatially calculated pixel for the generated deinterlaced pixels.

As explained above with reference to FIG. 4, the alpha blender 480 then blends the DRIN macroblock 422 with the interleaved macroblock 442 using the alpha value stored in the look-up table 484. The deinterlacing and the noise reduction are performed on the same macroblock where the operation performed changes from line to line in the output macroblock 446. On each line, either deinterlacing is performed for the generated lines or noise reduction is performed for the existing lines. But both operations are not performed on the same line.

By blending the DRIN macroblock 422 and the interleaved macroblock 442, the target macroblock 252 is deinterlaced and noise reduced. Accordingly, a separate pass to reduce noise in the target field need not be performed, additionally saving time and resources required for performing the noise reduction. The noise reduction performed on the target macroblock 252 is the field noise reduction. Therefore, the deinterlacing mode explained above includes both deinterlacing and the field noise reduction, but is referred herein as the deinterlacing mode for the sake of convenience. The field noise reduction mode performing only the field noise reduction is described below in detail with reference to FIG. 10.

Referring back to FIG. 8, the telecine detector 870 detects whether the video sequence includes telecine processed moving pictures. Telecine processed frames can be deinterlaced perfectly because the source material is already progressive. Therefore, once the target field F(N) and reference fields are determined to be part of telecine processed moving pictures, the telecine algorithm is used in place of the deinterlacing method described herein. The telecine algorithm detects repeated fields and recombines matching fields to produce the original progressive frames. The telecine detector 870 determines and stores the maximum of an 8×8 pixel SAD between the target macroblock 252 and the second previous macroblock 826 as well as between the MVZ macroblock 336 and the next field macroblock 724. Software looks at the results and determines if a telecine algorithm should be used across the entire field by comparing the 8×8 SAD values with a threshold.

Different algorithms or methods may be used to calculate the RMCD error 822 and the MAD error 824. For example, a longer or shorter version of the target window, the next field window and the previous field window may be used. Also, a different algorithm may be used for detecting the telecine processed macroblocks. The modules in the selector 460, whether alone or in combination with other modules, can be implemented for example, in software, hardware, firmware or any other combination thereof.

Figure 9A:
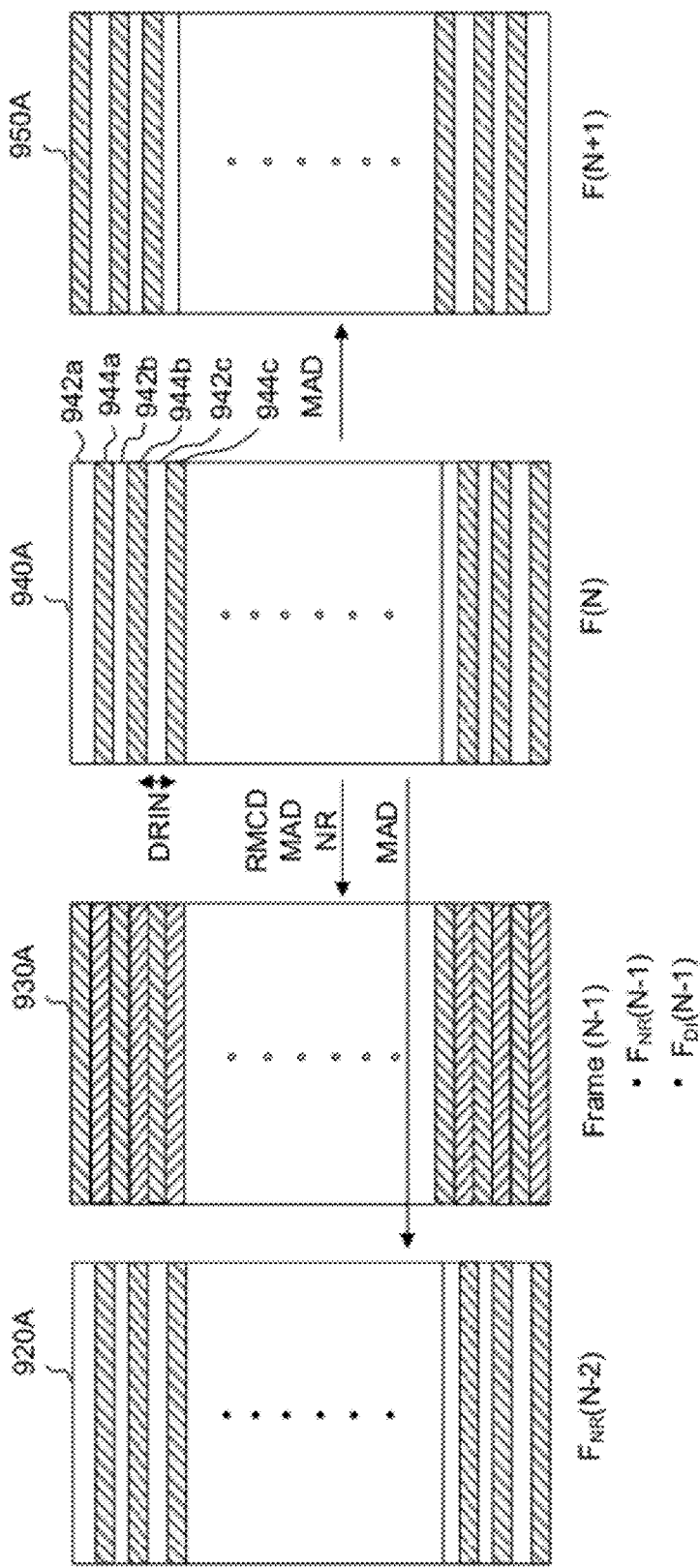
FIG. 9A is a diagram illustrating reference frames for deinterlacing a target frame when a scene change is not detected in the target frame or in a first previous frame, according to an embodiment.
Figure 9C:
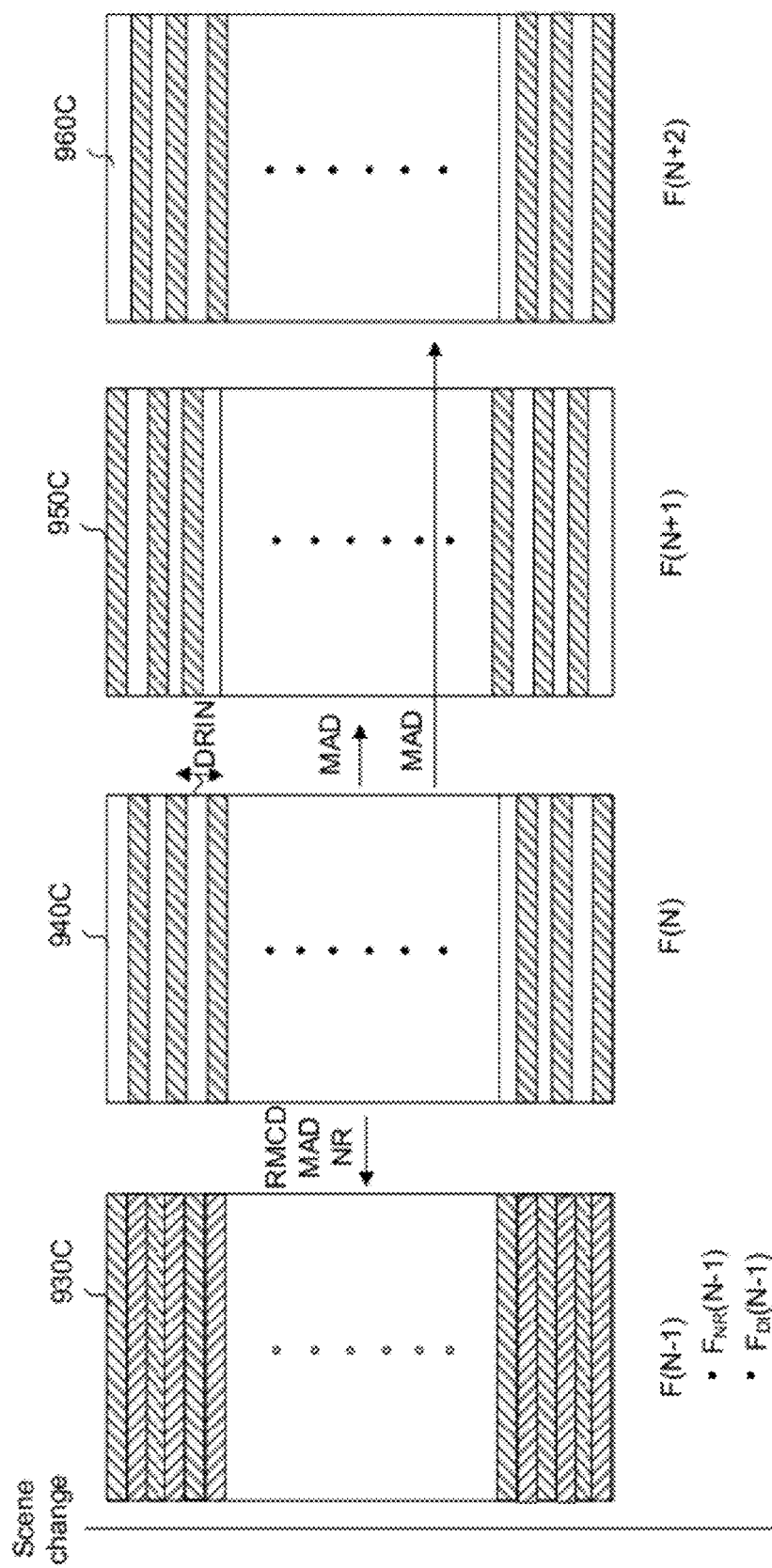
FIG. 9C is a diagram illustrating reference frames for deinterlacing a target frame when a scene change is detected in a first previous frame, according to an embodiment.

Reference Frames in the Deinterlacing Mode in Accordance with Scene Change Detection In FIGS. 9A to 9C, each box represents an output deinterlaced frame of the video sequence. The rows of each box represent horizontal lines of the frame, each horizontal line having a thickness of one-pixel in the vertical direction. The rows hashed in one direction represent the odd-numbered horizontal lines of the frame while the rows hashed in the other direction represent the even-numbered horizontal lines of the frame. Lines not hashed are lines missing from the field, which are to be generated by deinterlacing.

FIG. 9A is a diagram illustrating reference frames for deinterlacing a target frame 940A when a scene change is not detected in the target frame 940A and a frame 930A (preceding the target frame 940A). When the scene change is not detected, the deinterlacing is performed according to the process described above with reference to FIGS. 2 to 8. Specifically, the deinterlacing of the target frame 940A is performed using the noise reduced field $F_{NR}(N-1)$ and the deinterlaced field $F_{DI}(N-1)$ of the first previous frame Frame(N-1), the noise reduced field $F_{NR}(N-2)$ of the second previous output frame 920A (preceding the first previous frame 930A), the interlaced field of the first subsequent input and future output frame 950A.

Referring to FIG. 9A, the directional interpolated deinterlacing is performed by the DRIN module 420 (refer to FIG. 5) using the interlaced field of the target output frame Frame(N). For example, a directionally interpolated line for a missing line 942a is generated from an interlaced line 944a, and the last line from the macroblock above which is stored in a line buffer, directionally interpolated pixels in a missing line 942b are generated from pixels in interlaced lines 944a, 944b, and directionally interpolated pixels for missing line 942c are generated from pixels in interlaced lines 944b, 944c as explained above with reference to FIGS. 4 and 5. The recursive motion compensated deinterlacing (RMCD) is performed by the RMCD module 430 (refer to FIG. 6) using the noise reduced field $F_{NR}(N-1)$ and the deinterlaced field $F_{DI}(N-1)$ of the first previous output frame 930A. The motion adaptive deinterlacing is performed by the MAD module 440 (refer to FIG. 7) using the noise reduced field $F_{NR}(N-2)$ of the second previous frame 920A, the noise reduced field $F_{NR}(N-1)$, the target field F(N), and the interlaced field of the first subsequent output frame 950A.

With respect to the target field F(N) of the target output frame 940A, a noise reduction process (NR) is performed using the noise reduced field $F_{NR}(N-1)$ and the deinterlaced field $F_{DI}(N-1)$ of the first previous frame 930A. As explained above with reference to FIG. 4, the noise reduction is achieved by blending every other row of pixels in the DRIN macroblock 422 with the corresponding pixels in the interleaved macroblock 442 in the alpha blender 480. The pixels in the interleaved macroblock 442 are motion compensated, creating a motion compensated temporal noise filter.

FIG. 9B is a diagram illustrating reference fields for deinterlacing a target output frame 940B when a scene change is detection in a target field F(N). When the scene change is detected in the target field F(N), there is no previous relevant output frame with which to perform the recursive motion compensated deinterlacing, the motion adaptive deinterlacing or the noise reduction because the target output frame 940B does not resemble the previous frames. Only the directionally interpolated deinterlacing and the motion adaptive deinterlacing are performed on the target output frame 940B based on the interlaced field F(N+1) of a subsequent output frame 950B, the interlaced field F(N+2) of a second subsequent output frame 960B (following a first subsequent frame 950B), the interlaced field F(N+3) of a third subsequent output frame 970B (following the second subsequent frame 960B), and the interlaced field of the target frame 940B.

When the scene change is detected in the target frame 940B, the DRIN macroblock 422 and the MAD macroblock 440 are generated. The RMCD macroblock 430 is not generated. The deinterlaced lines of the DRIN macroblock 422 and the MAD macroblock 442 are blended using the alpha value that is determined by the noise calculation 482 and the pixel error macroblock 461, as described above in detail. The noise reduced lines of the output macroblock 446 is set by default to the target macroblock 252 lines (interleaved into macroblock 422 by the DRIN module 420). Because of this, these lines are not noise reduced for the scene change case. The process of generating the DRIN macroblock 422 and the process of generating the MAD macroblock 426 are substantially the same as explained above with reference to FIGS. 4 and 5, respectively.

To perform motion adaptive deinterlacing when the scene change is detected in the target frame 940B, only target and subsequent fields are available and used to detect non-moving pixels for the deinterlaced field. This shifts the MAD checked pixel by one output frame position later, but only when a scene change occurs. The MAD macroblock 426 is then provided to the multiplexer 450 where the MAD macroblock 428 is bypassed to the interleaver 470. The interleaver 470 then interleaves the MAD macroblock 426 with a fixed value that is ignored by the alpha blender 480 to generate the interleaved macroblock 442. The deinterlaced lines of interleaved macroblock 442 are then blended with the deinterlaced lines of DRIN macroblock 422 using an alpha value that is determined by the noise calculation 482 and the pixel error macroblock 461, as described above. The noise reduced lines of the output macroblock 446 default to the target macroblock 252 lines interleaved into macroblock 422 by the DRIN module by the alpha blender 480. Because of this, these lines are not noise reduced for the scene change case. After receiving the blended macroblock 446, the writer 492 divides up the blended macroblock 446 into the deinterlaced macroblock of the target frame that is stored as part of data for the $F_{DI}(N)$, and the noise reduced macroblock of the target frame that is stored as part of data for the $F_{NR}(N)$. As described above in detail, no noise reduction is performed for the interlaced field F(N) of the target frame 940B when a scene change occurs.

FIG. 9C is a diagram illustrating reference frames for deinterlacing a target frame 940C when a scene change is detected in an output frame 930C (preceding the target output frame 940C). The previous frame 930C is deinterlaced as described with reference to FIG. 9B. When deinterlacing the target frame 940C, the DRIN macroblock 422 is generated in a manner substantially similar to the manner described above with reference to FIGS. 9A and 9B. The RMCD macroblock 424 is also generated by the RMCD module 430 as explained above with reference to FIG. 9A. To generate the MAD macroblock 426, the interlaced field F(N+1) of the first subsequent output frame 950C and the interlaced field F(N+2) of the second subsequent output frame 960C is used. Specifically, the selector fetcher 850 retrieves a macroblock of the second subsequent output frame 960C from a location corresponding to the target macroblock 252 instead of from the second previous output frame. Other than this difference, the MAD macroblock 426 is generated in a manner substantially similar to the manner described above with reference to FIG. 9A.

The selector 460, the multiplexer 450, the interleaver 470, the scene change detector 490, the alpha blender 480, and the writer 492 perform the functions and operations substantially similar to the functions and operations described above with reference to FIGS. 2 to 9A.

Method of Operating the Media Processor in Multiple Modes

Figure 10:
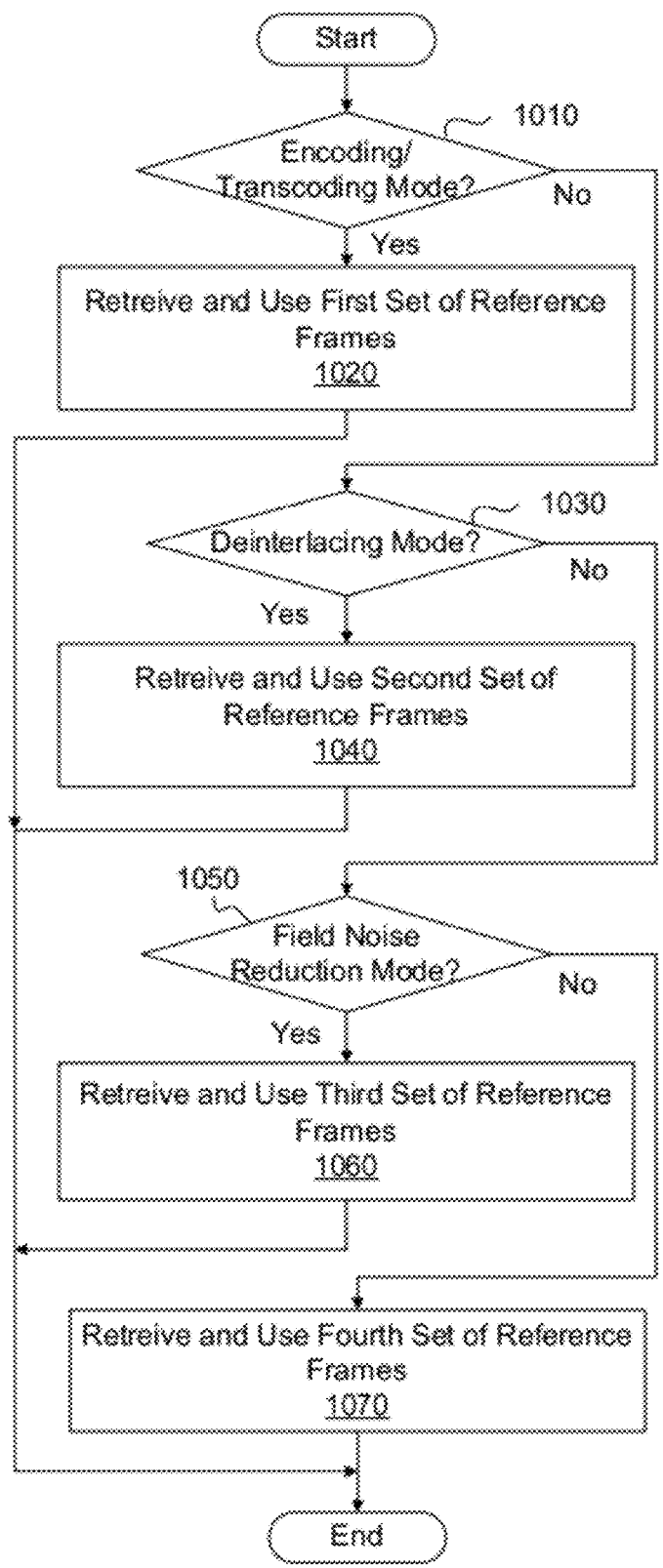
FIG. 10 is a flow chart illustrating a method of operating a media processor in different operating modes, according to an embodiment.

FIG. 10 is a flow chart illustrating an embodiment of operating the media processor 100 in different modes. In the embodiment of FIG. 10, the media processor 100 operates in four modes. The first mode is the encoding/transcoding mode where the video sequence is encoded or transcoded without using the image processor 180. The other three modes are the deinterlacing mode, the field noise reduction mode, and the frame noise reduction mode. The deinterlacing mode may perform the deinterlacing as well as the field noise reduction.

First, it is determined 1010 whether the media processor 100 is in the encoding/transcoding mode. If the media processor 100 is in the encoding/transcoding mode, a first set of reference frames is selected according to the encoding or transcoding scheme performed. The encoding transcoding modules 220 of the encoder/transcoder 160 receives, among others, the motion vector 260, and the predictor and residual 261 from the motion estimation engine 230, and the target macroblock 252 from the macroblock fetcher 210 to perform the encoding/transcoding process.

If the media processor 100 is not in the encoding/transcoding mode, it is determined 1030 whether the media processor 100 is in the deinterlacing mode. If the media processor 100 is in the deinterlacing mode, a second set of reference frames is retrieved and used for deinterlacing. The second set of reference frames, for example, include the first previous field F(N−1), the second previous field F(N−2), and the first subsequent field F(N+1) when the scene change is not detected in the target field F(N) or the first previous field F(N−1), as explained above with reference to FIG. 9A.

If the media processor 100 is not in the encoding/transcoding mode nor in the deinterlacing mode, it is determined 1050 whether the media processor 100 is in the field noise reduction mode. If the media processor 100 is in the field noise reduction mode, the third set of reference frames is retrieved and used 1060, as explained below in detail with reference to FIGS. 16, 17 and 19. The third set of reference frames, for example, includes the first previous field F(N−1), and the second previous field F(N−2). The field noise reduction mode is distinct from the deinterlacing mode. In the field noise reduction mode, only field noise reduction is performed. No deinterlacing is performed in the field noise reduction mode.

If the media processor 100 is not in the encoding/transcoding mode, the deinterlacing mode, or the field noise reduction mode, the media processor 100 is determined to be in the frame noise reduction mode. In the frame noise reduction mode, a fourth set of reference frames is retrieved and used 1070 for processing, as explained below in detail with reference to FIGS. 17 to 19. The fourth set of reference frames include, for example, the first previous frame Frame(N−1).

Method of Deinterlacing Interlaced Target Frame

Figure 11A:
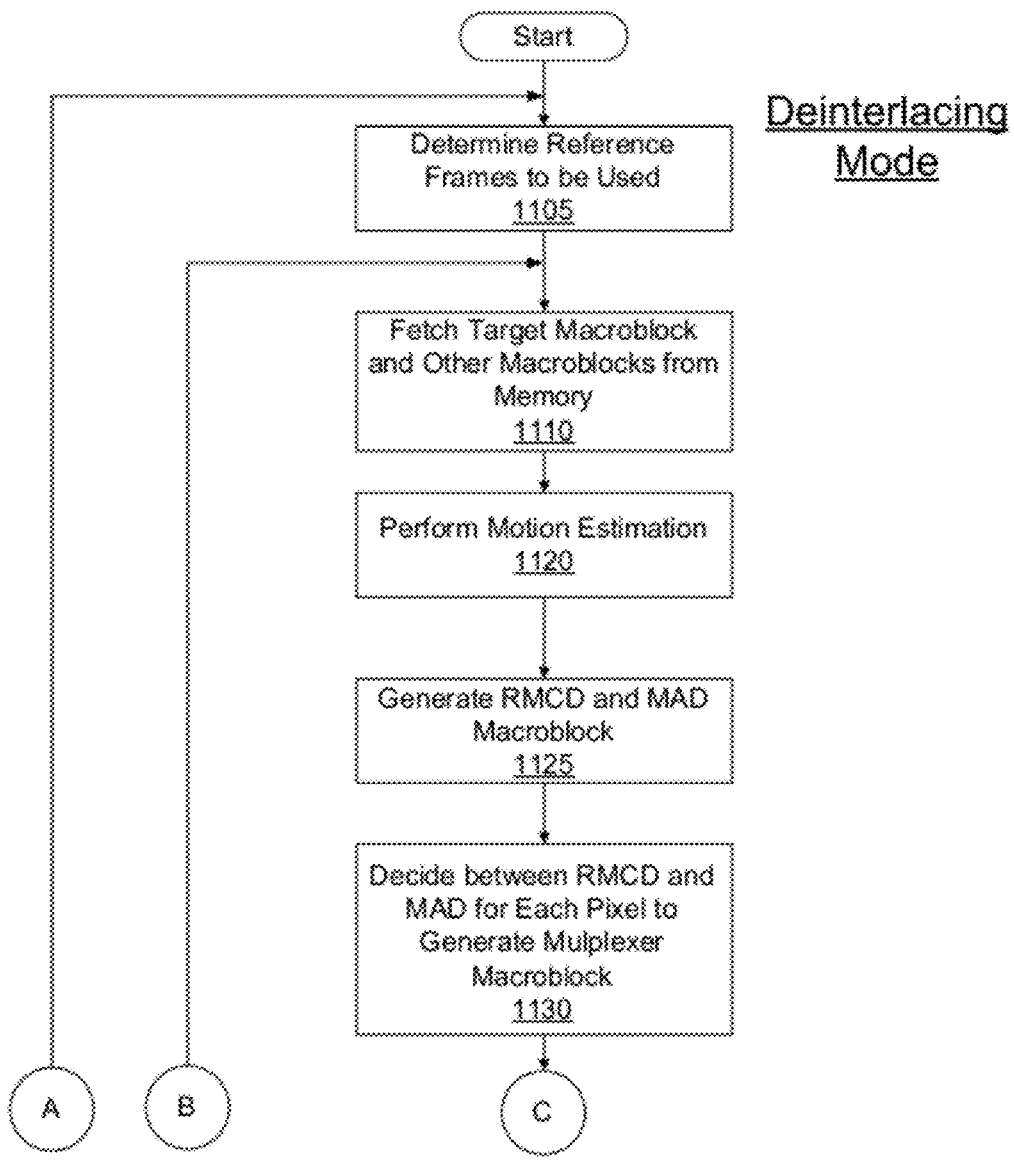
FIGS. 11A and 11B are flow charts illustrating a method of deinterlacing an interlaced frame, according to an embodiment.
Figure 11B:
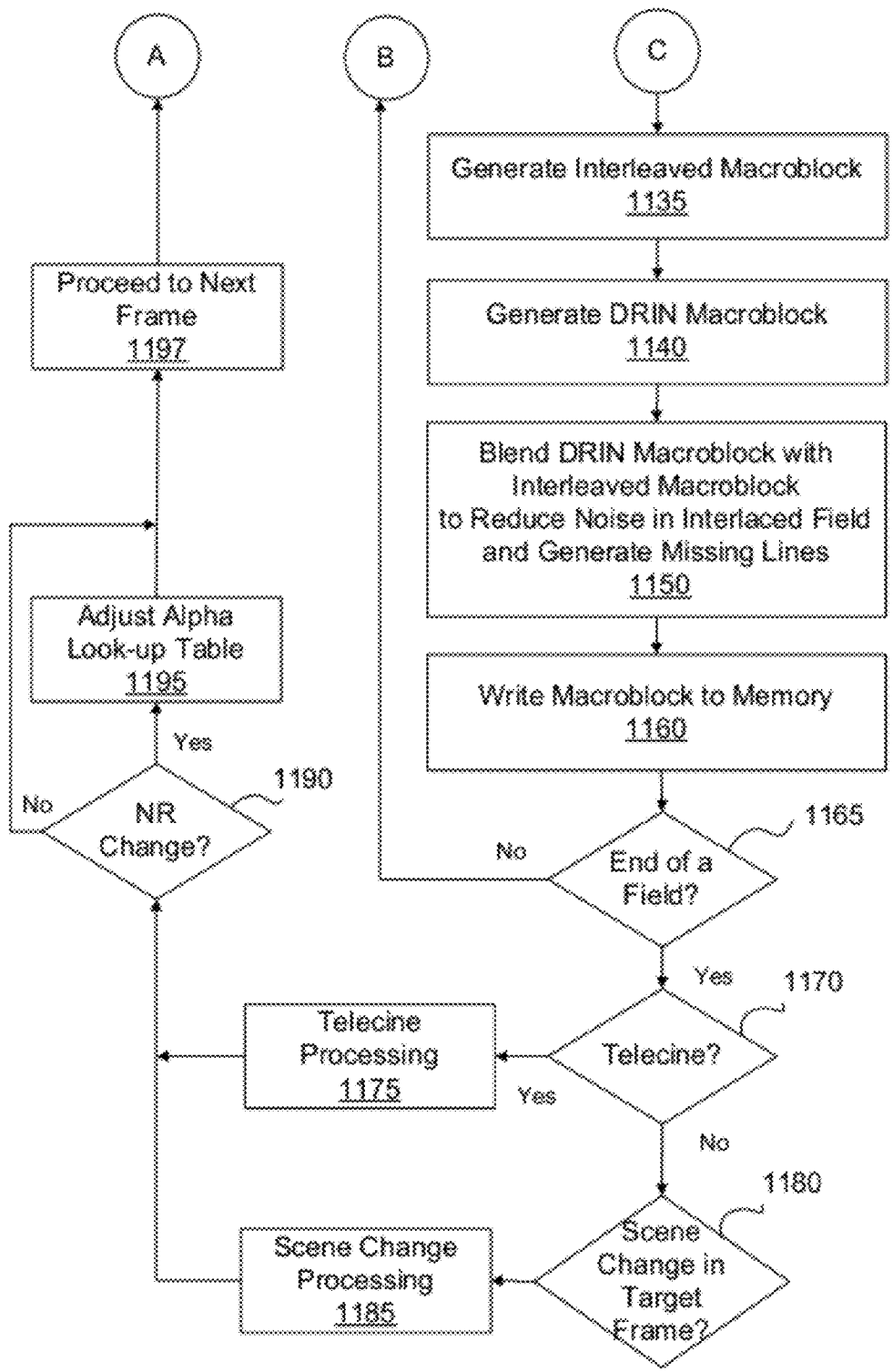

FIGS. 11A and 11B are flow charts illustrating an embodiment of a method for deinterlacing the interlaced target field F(N). First, the reference frames to be used are determined 1105 based on whether a scene change is detected by the scene change detector 490, as explained in detail with reference to FIG. 12. Then, the target macroblock 252 and macroblocks from the reference frames (as determined in the step 1105) are fetched from the memory 190 by the macroblock fetcher 210, the search buffer fetcher 360, the next field fetcher 720, and the selector fetcher 850. Then the motion estimation 1120 is performed by the motion estimation engine 230, as described in detail with reference to FIG. 13. Based on the predictors generated by the motion estimation engine 230, the RMCD macroblock 424 is generated 1125. Also, the MAD macroblock 426 is generated 1125 from the MVZ macroblock 336 from the motion estimation engine 230. Then, for each pixel of the missing lines in the target output frame Frame(N), it is determined 1135 whether to use a pixel from the RMCD macroblock 424 or to use a pixel from the MAD macroblock 426 to generate a multiplexer macroblock 428, as explained in detail below with reference to FIG. 14. Then the multiplexer macroblock 428 is interleaved with the MP predictor 332 to generate 1135 the interleaved macroblock 442.

Next, the DRIN macroblock 422 is generated 1140 by the DRIN macroblock 422. As explained above with reference to FIG. 5, the intermediate macroblock 530 is generated by the directionally interpolated macroblock generator 520. Then, the intermediate macroblock 530 is interleaved with the target macroblock 252 to generate the DRIN macroblock 422.

The DRIN macroblock 422 is then blended 1150 with the interleaved macroblock 442 by the alpha blender 480 to reduce noise in the pixels of interlaced field F(N) of the target frame Frame(N) and generate pixels for the missing lines of the target frame Frame(N) in the same pass as explained in detail below with reference to FIG. 15.

After writing the blended macroblock 446 to the memory 190, it is determined 1165 whether the target macroblock was the last macroblock of the target field F(N). If not, the process returns to the step 1110 to fetch the next target macroblock and repeat the steps of 1120 to 1160.

If it is determined 1165 that the last macroblock of the target field F(N) is reached, then it is determined 1170 whether the target field F(N) is a telecine processed frame. If the target field F(N) is telecine processed frame, then the process proceeds to telecine processing 1175. The telecine processing 1175 for telecine frames continues until the end of the telecine frames is detected. Then, the process proceeds to the step of determining 1190 if there are any adjustments needed to the alpha lookup table 484 based on the noise measurement. Increased noise in the video means the decision either that an alpha value should be selected from the alpha lookup table 484 to blend towards pixels from the RMCD module 430 or that MAD module 440 needs to allow a bigger per pixel error in the macroblock 461 from the selector 460. If it is determined that the target frame is not a telecine processed frame the process proceeds to determine 1180 if a scene change is detected.

The scene change in the target field F(N) is detected by the scene change detector 490. If the scene change is detected in the target field F(N), scene change processing 1185 of the target field F(N) is performed. In the step 1185, the process explained above with reference to FIG. 9B is performed. Specifically, the directional interpolation and the motion adaptive deinterlacing is repeated on the target field F(N). As explained above with reference to FIG. 9B, the interleaver macroblock 442 is forced to use only the MAD macroblock 426 and interleaved with a constant dummy value. The interleaver macroblock 442 is blended with the DRIN macroblock 422 in the alpha blender 480 for the generated deinterlaced lines while the rest of the lines of pixels are taken directly from the target macroblock 252 from the DRIN macroblock 422 as noise reduction is not performed for scene changes. Therefore, the new blended macroblock 446 generated overwrites the previous macroblock written to the memory 190 in the step 1160. Scene change processing 1185 must follow determination 1165 whether the last macroblock of the target field F(N) is reached because the scene detection is not based on the SAD of one target macroblock 252, but based on the SAD of all the target macroblocks 252 of the target field F(N). The scene changes occur infrequently. Therefore, it is more efficient to deinterlace the target field F(N) based on the assumption that the scene change will not occur in the target field F(N) and later correct (by overwriting the macroblocks) if it is later determined that the scene change has occurred in the target frame.

If the noise level for the input video has changed, then the alpha look-up table 484 of the alpha blender 480 is adjusted 1195 accordingly so that the correct amount of pixels from macroblocks created by the RMCD module 430 and the MAD module 440 is used to generate the blended macroblock 446. Then the process proceeds 1197 to the next frame and returns to determining 1105 the reference frames to be used where the reference frames for the target frame is determined. The processes of generating RMCD and MAD macroblocks 1125 to the generating 1135 of the interleaved macroblock can be performed in parallel with the generation 1140 of the DRIN macroblock.

Figure 12:
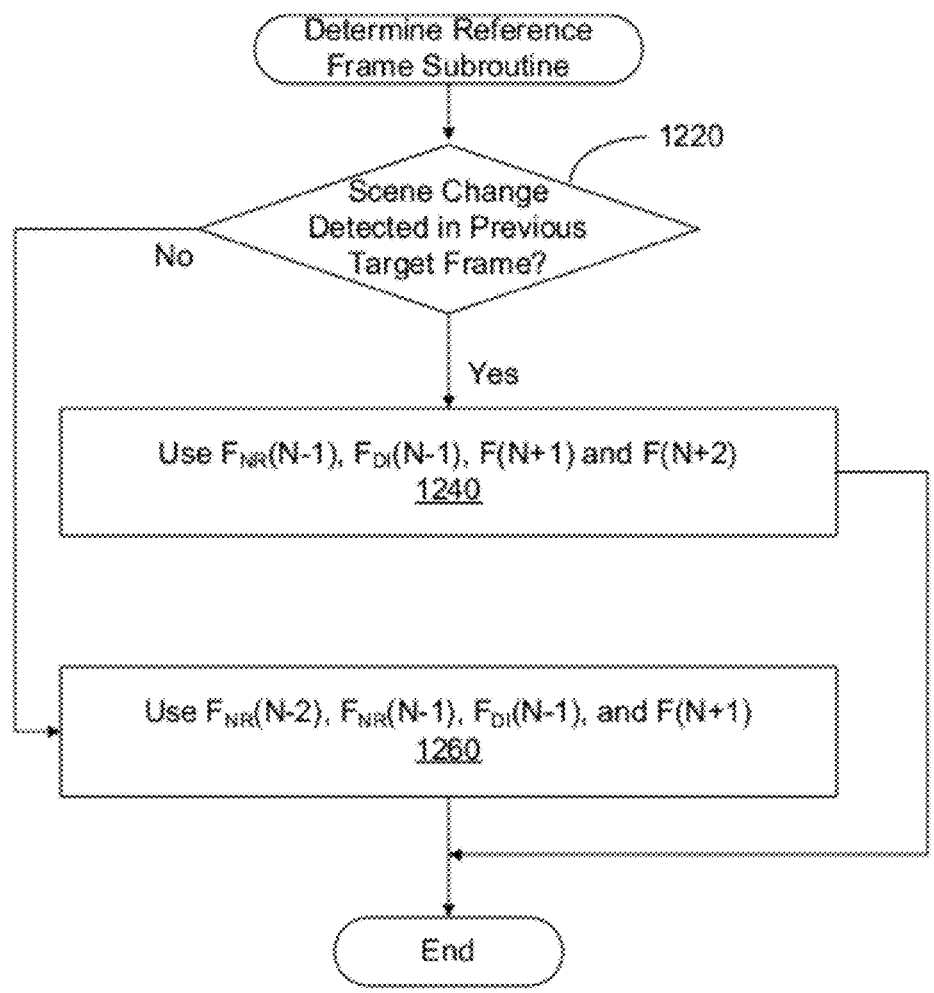
FIG. 12 is a flow chart illustrating in detail the process of determining reference frames, shown in FIG. 11A.

FIG. 12 is a flow chart illustrating in detail the step 1105 for determining the reference frames shown in FIG. 11A. First, it is determined 1220 whether a scene change was detected during the processing of the previous target output frame Frame(N−1) in the step 1180 of FIG. 11B. If the scene change was detected in the previous target output frame Frame(N−1) (i.e., the target frame of the previous pass), then the deinterlacing process described above with reference to FIG. 9C is implemented. Accordingly, the noise reduced field $F_{NR}(N-1)$ of the previous frame, the deinterlaced field $F_{DI}(N-1)$, the first subsequent field F(N+1), and the second subsequent field F(N+2) are used in the following steps 1110 to 1185. If the scene change was not detected in the previous target frame Frame(N−1), then the deinterlacing process explained above with reference to FIG. 9A is implemented. Accordingly, the noise reduce field $F_{NR}(N-2)$ of the second previous frame, the noise reduced field $F_{NR}(N-1)$ of the first previous frame, the deinterlaced field $F_{DI}(N-1)$ of the first previous frame, and the interlaced field of the next field F(N+1) are used in the following steps 1110 to 1185. Note that the case where the scene change was detected in the target frame was discussed above with reference to the steps 1180 and 1185.

Figure 13:
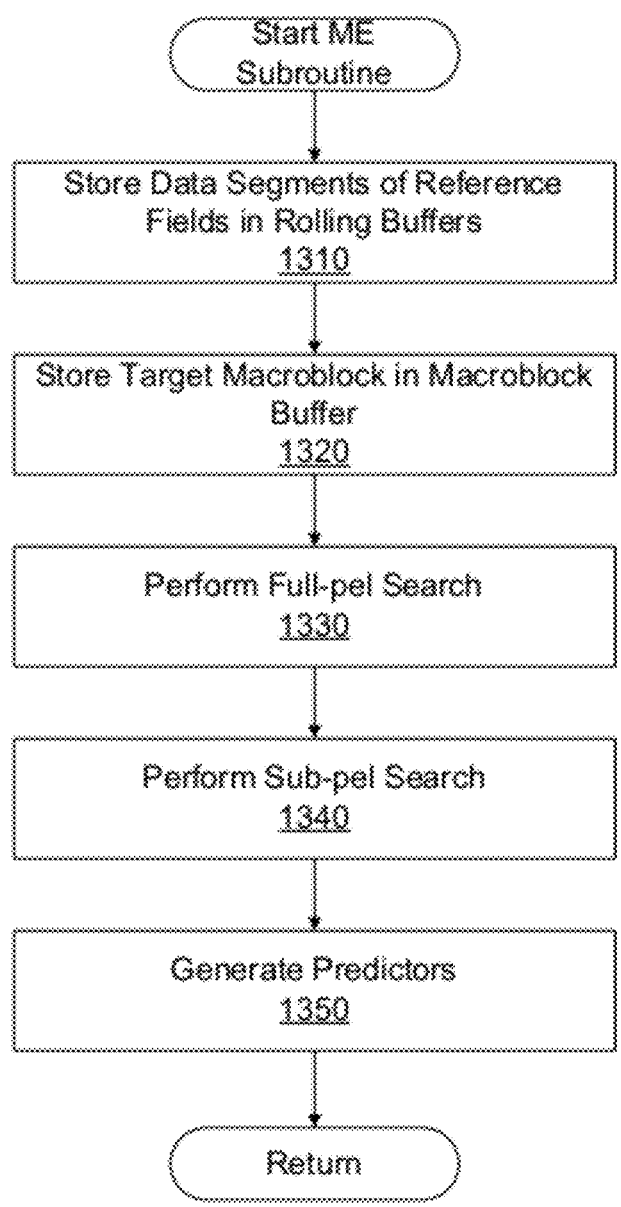
FIG. 13 is a flow chart illustrating in detail the process of performing motion estimation, shown in FIG. 11A.

FIG. 13 is a flow chart illustrating in detail the step 1120 for performing the motion estimation as shown in FIG. 11A. First, the data segments of reference fields (i.e., $F_{DI}(N-1)$ and $F_{NR}(N-1)$) are stored 1310 on the first and second rolling buffers 352, 354. Then the target macroblock 252 is retrieved from the memory 190 and stored 1320 in the macroblock buffer 310. The full-pel search is performed 1330 to determine the motion vectors for the best matching macroblock in the data segments of the reference frames. Then the sub-pel search is performed 1340 to generate motion vectors of non-integer values. Based on the full-pel search and the sub-pel search, the MP predictor 332 and the IP predictor 334 are generated 1350.

Figure 14:
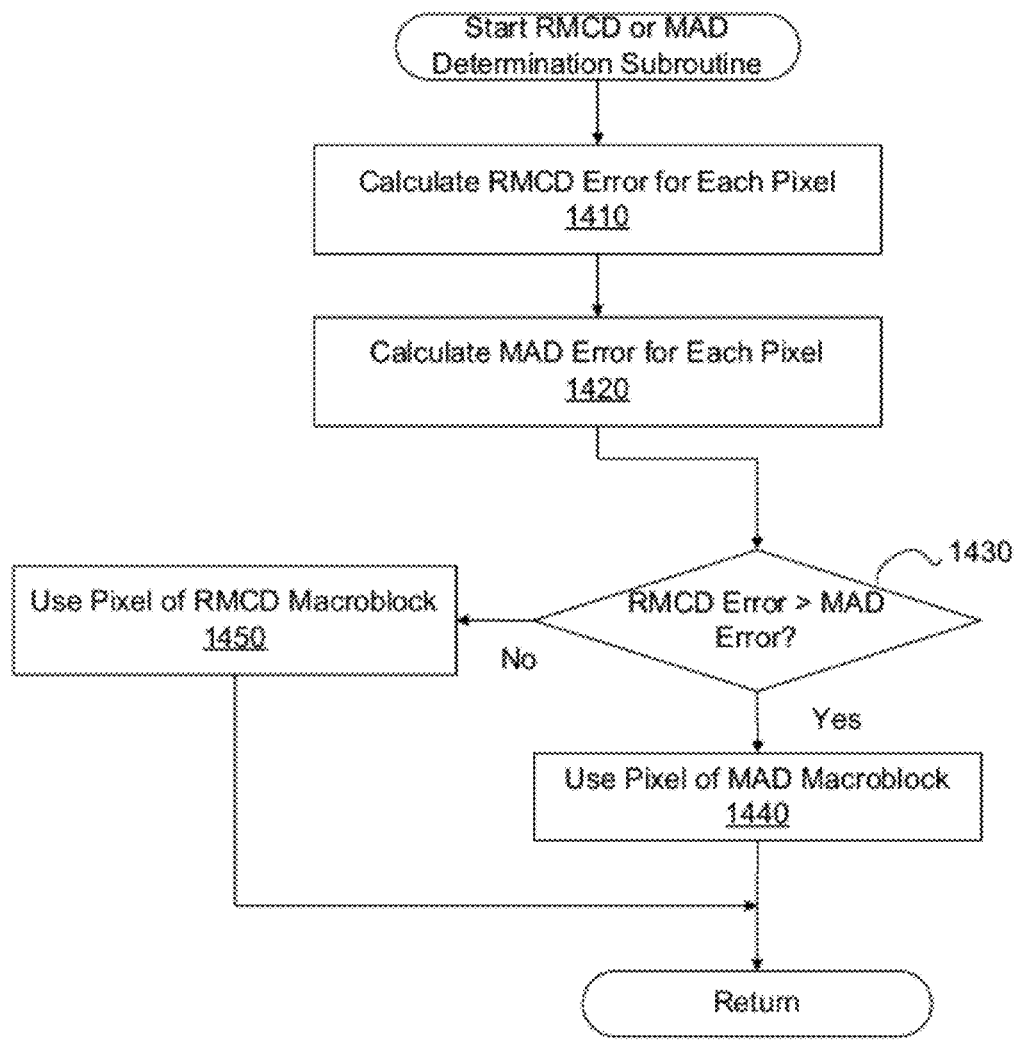
FIG. 14 is a flow chart illustrating in detail the process of deciding between a pixel generated by recursive motion compensated deinterlacing and a pixel generated by motion adaptive deinterlacing, according to an embodiment.

FIG. 14 is a flow chart illustrating in detail the step 1130 for deciding between a pixel from the RMCD macroblock 424 and the MAD macroblock 426 as shown in FIG. 11A. First, the RMCD error 822 for each target pixel is calculated 1410. Specifically, the RMCD error 822 is calculated from a maximum difference 444 of pixels of the target macroblock 252 and corresponding pixels of the MP predictor 332, across a five-pixel window by the RMCD error calculator 820 as described above with reference to FIG. 8. The five-pixel window includes the target pixel, two pixels to the left of the target pixel, and two pixels to the right of the target pixel. If pixels to the left or right are unavailable because the pixels go beyond what is provided by the difference 444, then the closest available pixels are duplicated as a substitute.

The MAD error 824 for each target pixel is calculated 1420 as described above with reference to FIG. 8. Specifically, the first window comparator 830 calculates the first difference 832 which is the maximum difference between pixels in the target window of the MVZ macroblock and the corresponding pixels in the next field window of the next macroblock 724. The target field window includes the target pixel, two pixels to the left of the target pixel, and two pixels to the right of the target pixel. If pixels to the left or right are unavailable because the pixels go beyond what is provided by the difference 444, then the closest available pixels are duplicated as a substitute. Then the second window comparator 840 calculates a second difference 842 in the target window between the target field window and a second previous field window including pixels of the second previous macroblock 826 at locations corresponding to the physical pixel locations directly above and below the pixels in the target field window 842. The target field window includes the location above or below the target pixel, two pixels to the left of that location, and two pixels to the right of that location. If pixels to the left or right are unavailable because the pixels go beyond what is provided by the difference, then the closest available pixels are duplicated as a substitute. The MAD error selector 860 chooses the higher value of the first difference 832 and the second difference 842 as the MAD error 824.

Then the RMCD error 822 is compared 1430 with the MAD error 824. If the RMCD error 822 is less than the MAD error 824, then the pixel of the RMCD macroblock 424 is used 1450 as the pixel for the target pixel and the RMCD error is passed as 461. If the RMCD error 822 is greater than or equal to the MAD error 824, then the pixel of the MAD macroblock 426 is used 1440 as the pixel for the target pixel and the MAD error is passed as 461.

Figure 15:
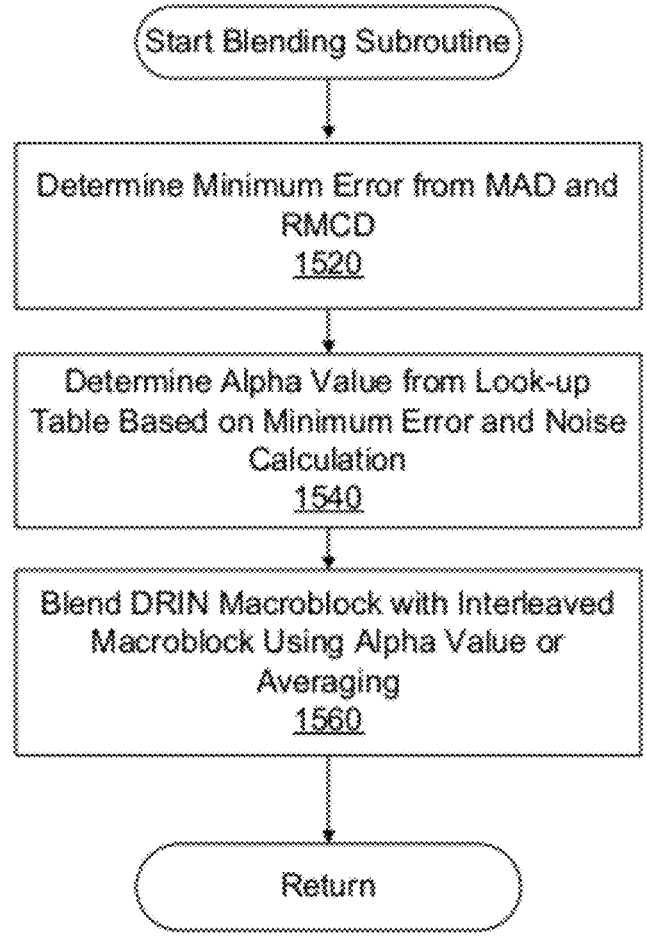
FIG. 15 is a flow chart illustrating in detail the steps for performing noise reduction, shown in FIG. 12A.

FIG. 15 is a flow chart illustrating in detail the step 1150 for blending as shown in FIG. 11B. First, the Selector 460 determines 1520 the minimum error 461 for either RMCD or MAD and passes the error on a per pixel basis to the alpha look-up table 484. Next, the alpha value for each pixel is determined 1540 based on the error macroblock 461 and the noise calculation 482. Continuing on, the generated deinterlaced output lines of DRIN macroblock 422 are blended 1560 with the interleaved macroblock 442 using the alpha value to generate the blended macroblock 446. The noise reduced output lines of DRIN macroblock 422 are blended with the interleaved macroblock 442.

Field Noise Reduction Mode and Frame Noise Reduction Mode

Figure 16:
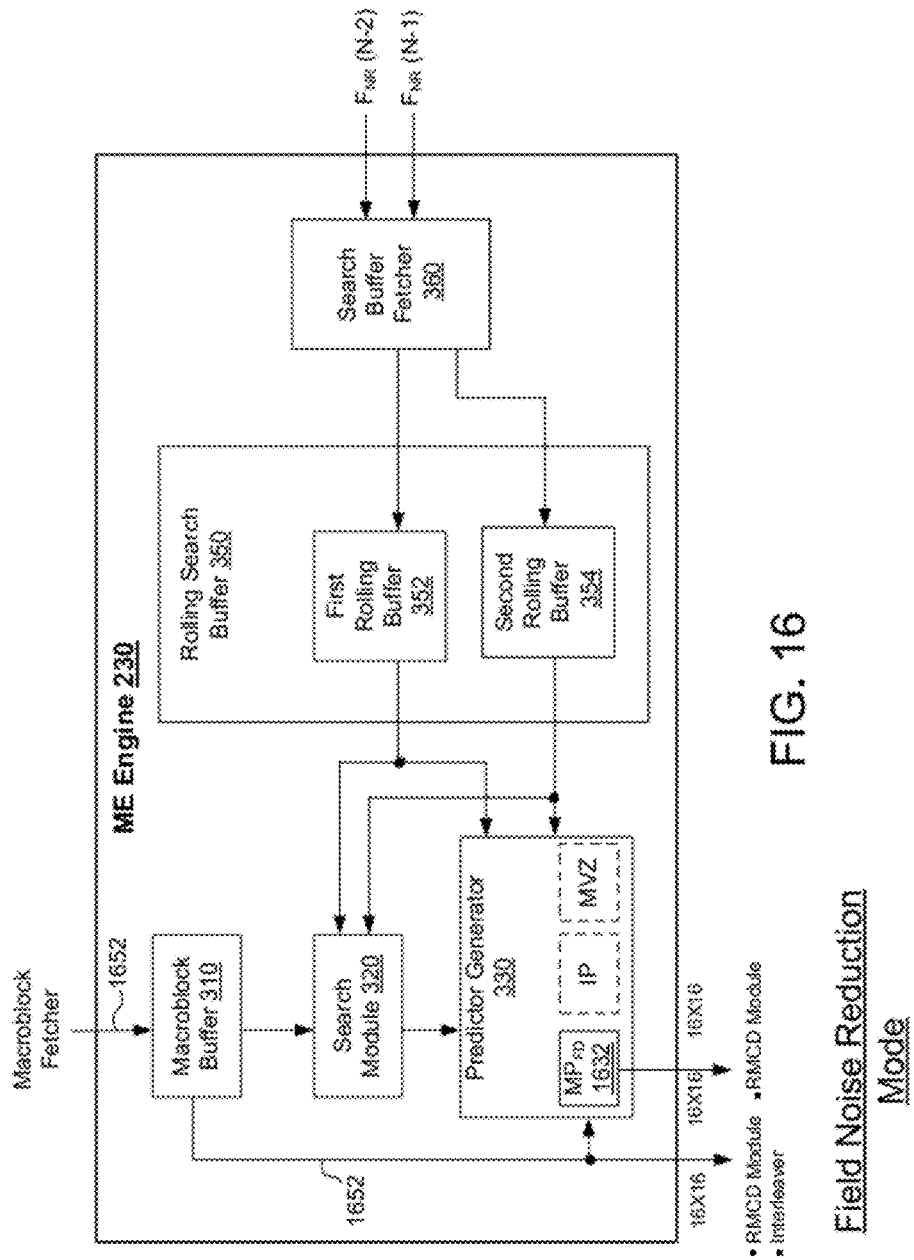
FIG. 16 is a block diagram illustrating an embodiment of a motion estimation engine for performing field noise reduction.

FIG. 16 is a block diagram illustrating an embodiment of a motion estimation engine 1630 for performing the field noise reduction. The motion estimation engine 1630 of FIG. 16 is substantially the same as the motion estimation engine 230 of FIG. 3 except that (i) the search buffer fetcher 360 retrieves a first data segment of the noise reduced field $F_{NR}(N-1)$ (stored in the first rolling buffer 352) and a second data segment of the noise reduced field $F_{NR}(N-2)$ (stored in the second rolling buffer 354), (ii) the predictor generator 330 generates a first predictor $MP_{FD}$ 1632 from either the first or second data segments that best matches the target macroblock 252 (the IP predictor and the MVZ macroblock are not generated by the predictor generator 330 or generated but not used). The size of the predictor $MP_{FD}$ 1632 and the target macroblock 252 are the same, for example, 16×16 pixels.

Figure 17:
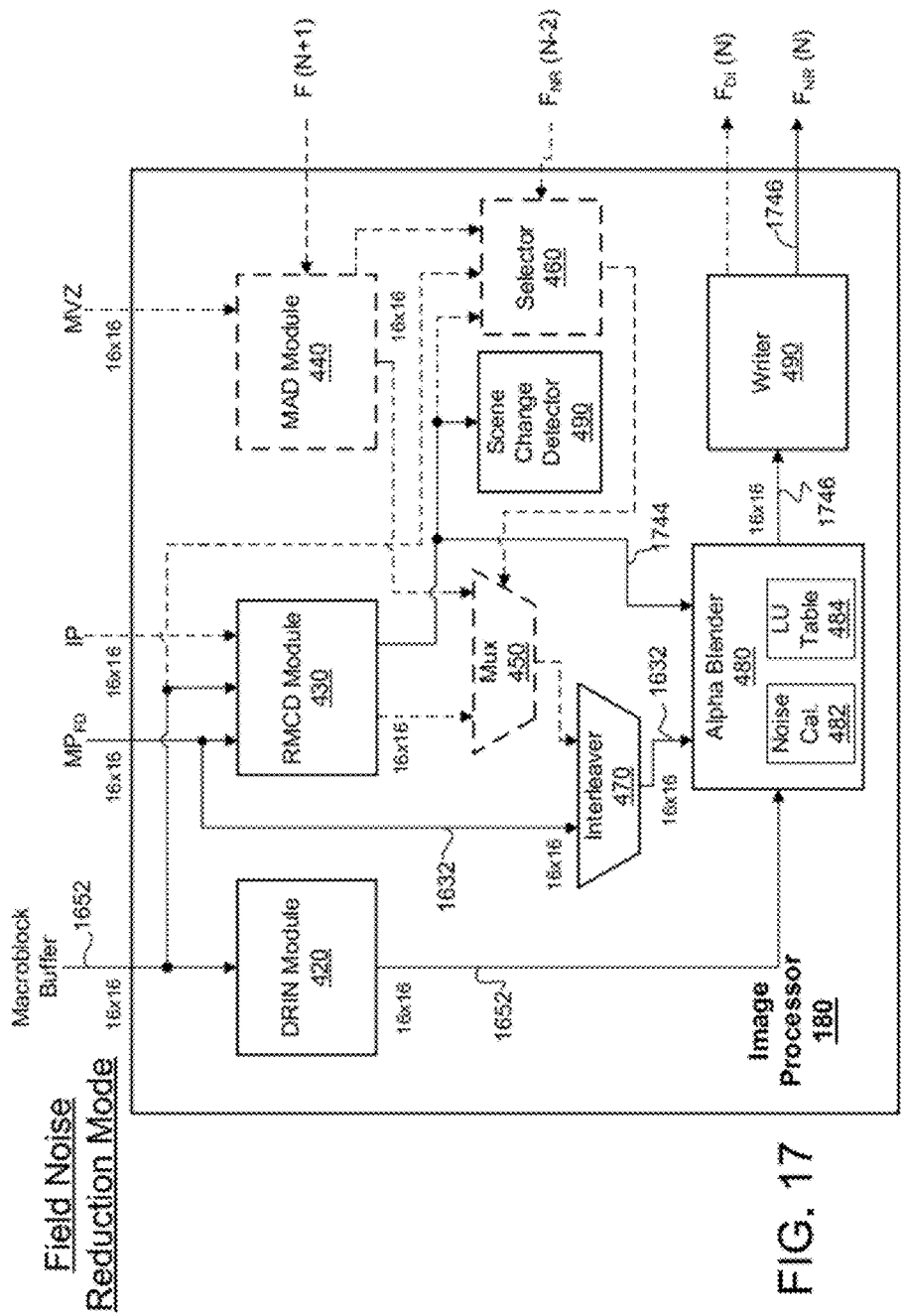
FIG. 17 is a block diagram illustrating an embodiment of an image processor for performing field noise reduction.

FIG. 17 is a block diagram illustrating an embodiment of the image processor 180 operating in the field noise reduction mode. The modules and the macroblocks active in the field noise reduction mode are shown in solid lines whereas the modules and macroblocks inactive in the field noise reduction mode are shown in dashed lines. Specifically, the MAD module 440, the multiplexer 450, and the selector 460 are deactivated in the field noise reduction mode. The DRIN module 420 only bypasses the target macroblock 1652 to the alpha blender 480 and does not generate the DRIN module 420. Therefore, the input to the DRIN module 420 and the output from the DRIN module 420 are identical (both shown in FIG. 17, for example, as having 16×16 pixels). The RMCD module 430 bypasses the $MP_{FD}$ predictor 1632 to the interleaver 470. The RMCD module 430 also generates a difference macroblock 1744 and sends it to the alpha blender 480 and the scene change detector 490. The interleaver 470 bypasses the $MP_{FD}$ predictor 1632 to the alpha blender 480. In the noise reduction mode, the interleaver 470 does not interleave macroblocks.

The RMCD module 430 generates a difference macroblock 1744 which is sent to the alpha blender 480. The difference macroblock 1744 is a macroblock generated by subtracting the luminance or chroma value of each pixels of the target macroblock 1652 from the luminance or chrominance values of corresponding pixels in the $MP_{FD}$ macroblock, as explained above with reference to FIG. 6. The alpha blender 480 then determines the per pixel alpha value for blending the target macroblock 1652 with the $MP_{FD}$ predictor 1632 based on the result of the noise calculation module 482 and the difference 1744. The blended macroblock 1746 is then sent to the writer 492. The writer 492 stores the blended macroblock 1746 on the memory 190.

Figure 18:
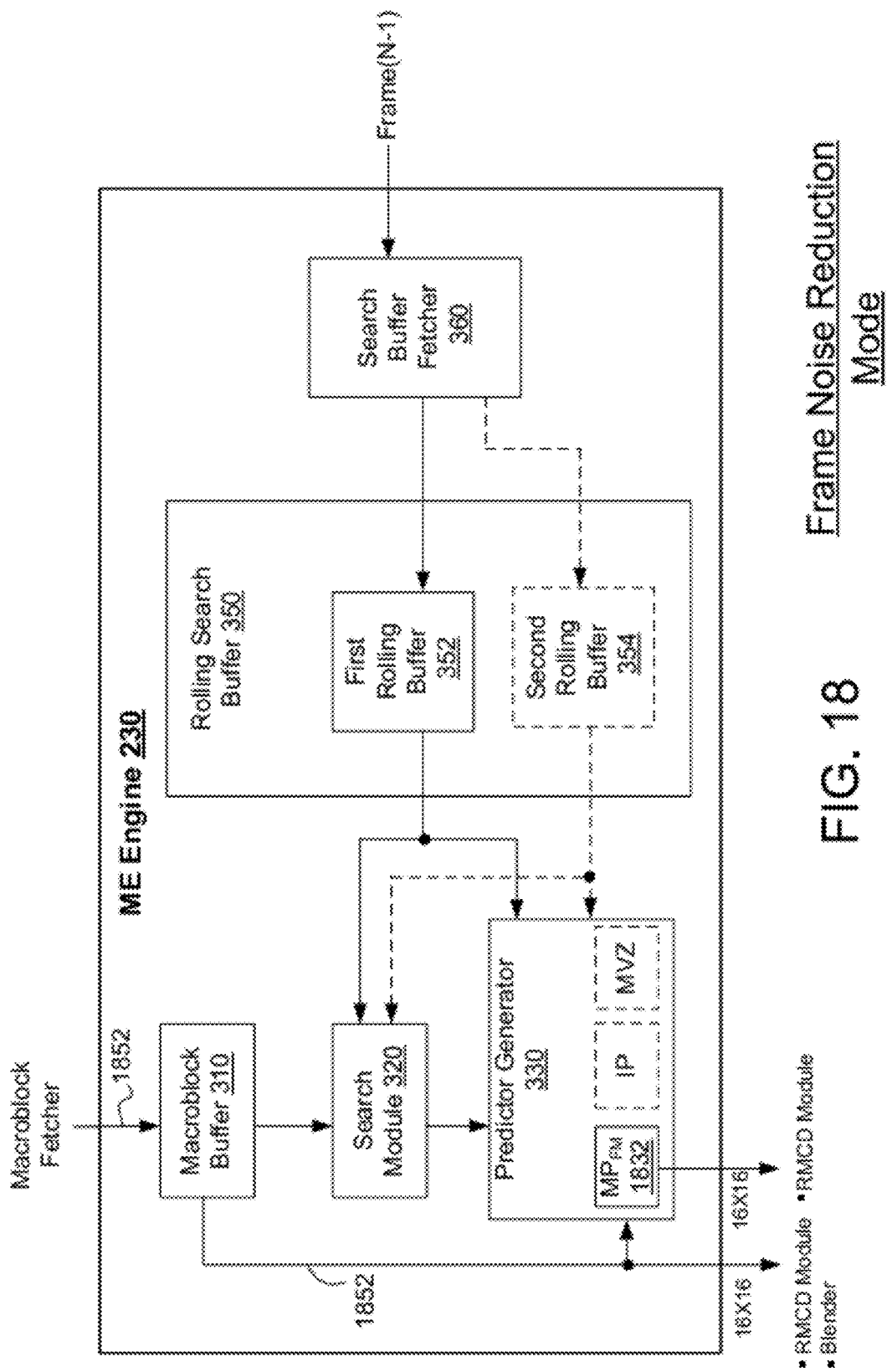
FIG. 18 is a block diagram illustrating an embodiment of a motion estimation engine for performing frame noise reduction.

FIG. 18 is a block diagram illustrating an embodiment of a motion estimation engine 230 for performing the frame noise reduction. The frame noise reduction mode is used for reducing noise in the video sequence comprised only of frames. The motion estimation engine 230 of FIG. 18 is substantially the same as the motion estimation engine 230 of FIG. 16 except that (i) the search buffer fetcher 360 retrieves only a data segment from the first previous frame Frame(N−1) and stores it in the first rolling buffer 352, and (ii) the predictor generator 330 generates a predictor $MP_{FM}$ 1832 from the data segment. The second rolling buffer 354 is deactivated. Like the embodiment of FIG. 16, the size of the $MP_{FM}$ predictor 1832 and the size of a target macroblock 1852 are the same, for example, both 16×16 pixels.

The image processor 180 coupled to the motion estimation 230 of FIG. 17 for performing the frame noise reduction is substantially the same as the image processor 180 of FIG. 17 except that the $MP_{FM}$ predictor 1832 is used in place of the $MP_{FD}$ predictor 1632.

Figure 19:
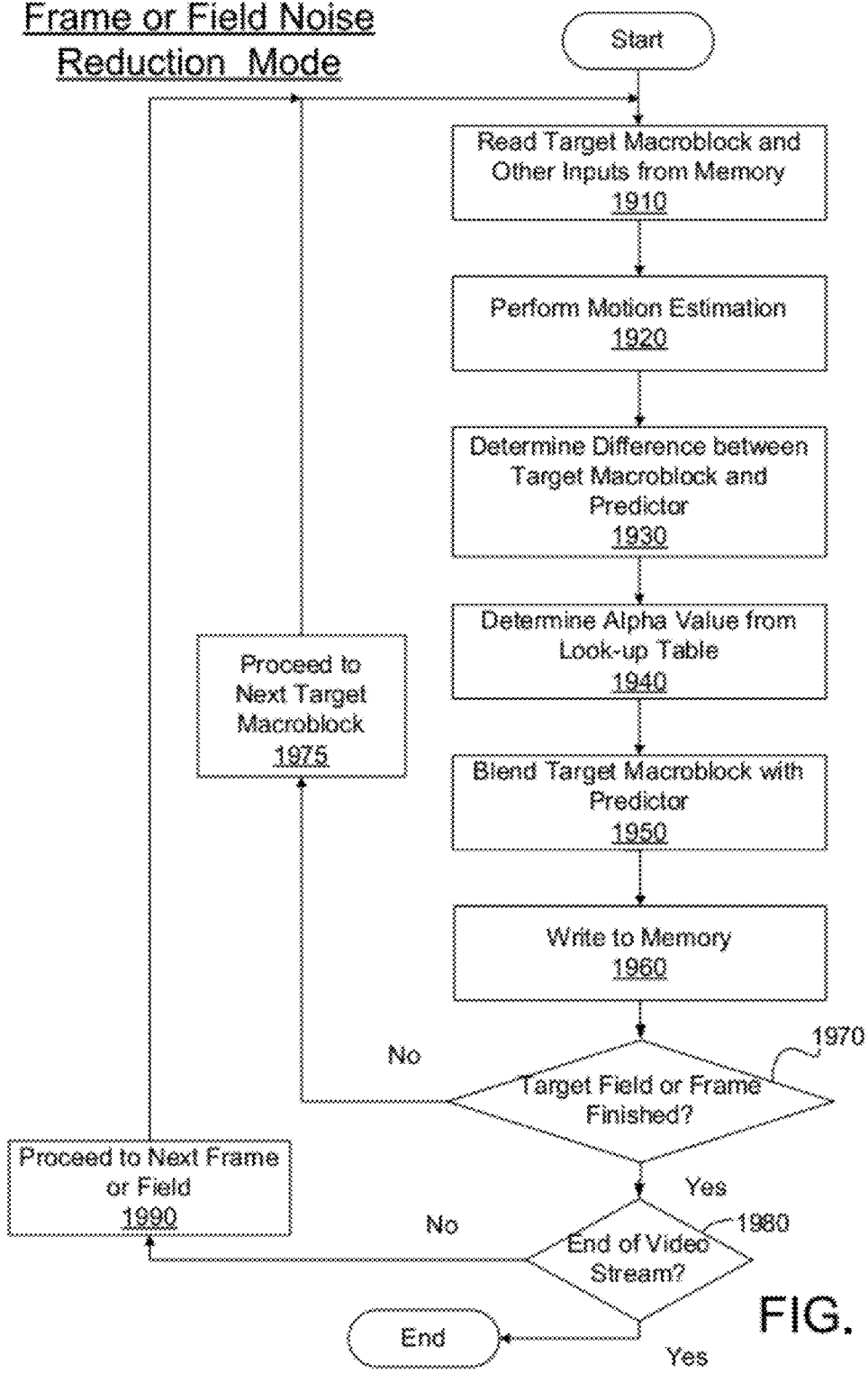
FIG. 19 is a flow chart illustrating a method for performing the field noise reduction or the frame noise reduction, according to an embodiment.

FIG. 19 is a flow chart illustrating an embodiment for performing the field noise reduction or the frame noise reduction. First, the target macroblock 1652 or 1852 and the data segment(s) for the rolling search buffer 350 is (are) retrieved 1910 from the memory 190. For the field noise reduction, the data segment of the noise reduced field $F_{NR}(N-1)$ and the data segment of the noise reduced field $F_{NR}(N-2)$ are retrieved as explained above with reference to FIG. 16. For the frame noise reduction, the data segment of the previous frame Frame(N−1) is retrieved, as explained above with reference to FIG. 18.

Next, the motion estimation is performed 1920 on the retrieved data segments to generate the predictors (the $MP_{FD}$ 1632 for the field noise reduction or the $MP_{FM}$ 1832 for the frame noise reduction). The difference between the target macroblock 1652 or 1852 and the predictors (the $MP_{FD}$ 1632 or the $MP_{FM}$ 1832) are determined 1930 by generating a difference macroblock 1744. Based on the difference macroblock 1744 and the noise calculation, the alpha value for blending the target macroblock 1652 or 1852 with the predictors (the $MP_{FD}$ predictor 1632 or the $MP_{FM}$ predictor 1832) is determined 1940 from the look-up table 484. The target macroblock 1652 or 1852 is blended 1950 with the $MP_{FD}$ predictor 1632 or the $MP_{FM}$ predictor 1832 to generate the blended macroblock 1746. The writer 492 then writes 1960 the blended macroblock 1746 to the memory 190. It is thereafter determined 1970 whether the noise reduction processing of the target field or the target frame is finished. If processing of the target field or the target frame is not finished, the process proceeds 1975 to the next target macroblock. If the processing of the target field or the target frame is finished, then it is determined 1980 whether the end of the video sequence has been reached. If not, the process proceeds 1990 to the next target frame or field. If the end of the video sequence has been reached, the noise reduction process is terminated.

An advantage of the above described embodiments is that the same motion estimation engine 230 and the image processor 180 are used for at least two different modes. Therefore, the hardware resources of the media processor 100 are efficiently used. Another advantage of the embodiments is that in the deinterlacing mode, the noise reduction is performed on the interlaced field of the target field in the same pass in which the deinterlacing is performed. Therefore, the media processor 100 more efficiently processes the video sequence. Yet another advantage of the embodiments is that the field noise reduction and the frame noise reduction are performed using the same estimation engine 230 and the image processor 180.

Alternate System (or Method) Embodiments

In one embodiment, the modules of the media processor 100 may be implemented in different physical devices. For example, the decoder 120, the scaler 140 and the memory 190 may be implemented in the form of a personal computer whereas the encoder/decoder 160 and the image processor 180 are implemented in the form of an integrated chip.

In one embodiment, only full-pel search is performed by the search module 320 in the deinterlacing mode. In this case, the MP and IP predictors fall on integer pixel boundaries. Also, the MVZ macroblock 336 may be provided from the rolling search buffer 350 or from the search buffer fetcher 360. Alternatively, the image processor 180 may include a fetcher directly retrieving the MVZ macroblock 336 from the memory 190.

The various embodiments disclosed herein may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

As noted previously, some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of embodiments of the present invention. This was done merely for convenience and to give a general sense of the embodiments of the present invention. This description should be read to include one or at least one and the singular also includes the plural unless it is obvious that it is meant otherwise.

Upon reading this disclosure, those of skill in the art will appreciate still additional alternative structural and functional designs for a system and a process for performing motion estimation, deinterlacing, or noise reduction through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the embodiments disclosed herein without departing from the spirit and scope as defined in the appended claims.

What is claimed is:

1. A video deinterlacer for deinterlacing a video sequence, the video sequence including a target input field and reference fields the video deinterlacer comprising:

a motion estimation engine configured to generate a predictor for a target data segment of an interlaced field of a target output frame from the reference fields, the predictor representing a data segment of the reference fields that best matches the target data segment;

an image processor coupled to the motion estimation engine and comprising:

a directional interpolation module configured to generate a first pixel of a deinterlaced field by performing directional interpolation on the interlaced field of the target output frame;

a recursive motion compensation deinterlacing module configured to generate a second pixel of the deinterlaced field of the target output frame by performing motion compensation on the interlaced field of the target output frame using at least the predictor, a location of the second pixel in the deinterlaced field same as a location of the first pixel in the deinterlaced field;

a motion adaptive module configured to generate a third pixel of the deinterlaced field of the target output frame by performing blending based on pixels of the reference fields, a location of the third pixel in the deinterlaced field same as the location of the first and second pixels in the deinterlaced field;

an interleaver configured to generate an intermediate data segment by at least interleaving a pixel of the predictor and the second pixel or the third pixel; and a blender configured to reduce noise in an output data segment by at least blending the first pixel and a pixel of the intermediate data segment at a location same as the first pixel.

2. The video deinterlacer of claim 1, wherein the motion estimation engine comprises:

a reference buffer configured to store the reference fields, each reference field comprising reference data segments;

a target buffer configured to store a target data segment of the interlaced field of the target output frame;

a search module coupled to the reference buffer and the target buffer, the search module configured to determine a predictor motion vector between the target data segment and the reference data segment that best matches the target data segment; and a predictor generator coupled to the search module and the reference buffer, the predictor generated configured to generate the predictor from the predictor motion vector.

3. The video deinterlacer of claim 1, wherein the image processor further comprises a selector module configured to choose between the second pixel and the third pixel for interleaving with the pixel of the predictor by comparing a recursive motion compensated deinterlacing (RMCD) error and a motion adaptive deinterlacing (MAD) error, the RMCD error representing a difference between the second target pixel and a corresponding pixel in the predictor, the MAD error representing a maximum difference between pixels in adjacent reference fields of the target input field at the same location as the third pixel, and differences between a pixel corresponding to the third pixel in a reference field preceding one of the adjacent reference fields and the target pixels above or below the third pixel.

4. The video deinterlacer of claim 1, wherein the alpha blending module is configured to blend the first pixels with the intermediate data segment based on weights given to the first pixel and the second or third pixel, the weights determined by an amount of error in the pixel and an amount of noise in the video sequence.

5. The video deinterlacer of claim 1, wherein the image processor further comprises a scene change detector coupled to the recursive motion compensation module for detecting a change in a scene based on a difference between the predictor and the target data segment of the interlaced field.

6. The video deinterlacer of claim 1, further comprising a telecine detector for determining whether the target input frame is part of a telecine processed video sequence by comparing pixels of the reference fields with each other and with the corresponding pixels of the target input field.

7. The video deinterlacer of claim 1, wherein the motion estimation engine is further configured to generate a sub-pel predictor for a target data segment from the reference fields, the sub-pel predictor representing a data segment generated by interpolating the reference fields that best matches the target data segment at a sub-pel level.

8. A method of deinterlacing an interlaced video sequence including interlaced target input frame and reference frames, the method comprising:

generating a predictor for a target data segment of the interlaced field of a target output frame from the reference fields, the predictor representing a data segment of the reference fields that best matches the target data segment;

generating a first pixel of a deinterlaced field by performing directional interpolation on the interlaced field of the target output frame;

generating a second pixel of the deinterlaced field of the target output frame by performing motion compensation on the interlaced field of the target frame using at least the predictor, a location of the second pixel in the deinterlaced field same as a location of the first pixel in the deinterlaced field;

generating a third pixel of the deinterlaced field of the target output frame by performing blending based on pixels of the reference fields, a location of the third pixel in the deinterlaced field same as the location of the first and second pixels in the deinterlaced field;

interleaving the predictor and the second pixel or the third pixel to generate an intermediate data segment; and reducing noise in an output data segment by blending the first pixel and a pixel of the intermediate data segment at a location same as the first pixel to generate a pixel of an output data segment.

9. The method of claim 8, further comprising choosing between the second pixel and the third pixel for interleaving with the pixel of the predictor by comparing a recursive motion compensated deinterlacing (RMCD) error and a motion adaptive deinterlacing (MAD) error, the RMCD error representing a difference between the target pixel and a corresponding pixel in the predictor, the MAD error representing a maximum difference between pixels in reference fields adjacent the target input field at the same location as the third pixel, and differences between the pixels above and below the third pixel location in a reference field preceding one of the adjacent reference fields and the corresponding target pixels above or below the third pixel.

10. The method of claim 9, further comprising blending the first pixel with the second or third pixel with weights given to the first pixel and the second or third pixel determined by the corresponding RMCD error or MAD error.

11. The method of claim 8, further comprising detecting a scene change based on a difference between the predictor and the target data segment of the target field.

12. The method of claim 8, further comprising determining whether the target input frame is part of a telecine video sequence by comparing pixels of the second previous reference field and the pixels of the target field and comparing the pixels of the adjacent reference fields.

13. The method of claim 8, further comprising generating a sub-pel predictor for a target data segment from the reference data of the reference fields, the sub-pel predictor representing a data segment generated by interpolating the reference fields to create the best match for the target data segment at a sub-pel level.

14. A method of deinterlacing an interlaced video sequence including a target frame and reference frames, the method comprising:

generating a deinterlaced field of the target frame from an interlaced target field of the target output frame, an interlaced field of a first previous output frame preceding the target frame, a deinterlaced field of the first previous output frame, an interlaced field of a second previous output frame preceding the first previous output frame, and a first subsequent interlaced field, responsive to a scene change not being detected in the target frame or the first previous output frame; and generating the deinterlaced field of the target output frame from the interlaced field of the target output frame, the interlaced field of the first subsequent output frame subsequent to the target output frame, an interlaced field of a second subsequent output frame subsequent to the first subsequent output frame, the interlaced field of the first previous output frame, and the deinterlaced field of the first previous output frame, responsive to the scene change being detected in the first previous output frame.

15. The method of claim 14, further comprising:

generating the deinterlaced field of the target frame from the interlaced field of the target output frame, the interlaced field of the second subsequent output frame, and an interlaced field of a third subsequent output frame subsequent to the second subsequent output frame, responsive to detecting the scene change in the target frame.

16. The method of claim 14, further comprising performing noise reduction of the interlaced field of the target output frame using the interlaced field and deinterlaced field of the first previous output frame.

* * * * *